US010543840B2

(12) United States Patent
Takeda

(10) Patent No.: US 10,543,840 B2
(45) Date of Patent: Jan. 28, 2020

(54) VEHICLE CONTROL SYSTEM, VEHICLE CONTROL METHOD, AND VEHICLE CONTROL PROGRAM FOR AUTOMATICALLY CONTROLLING VEHICLE BASED ON GENERATED TARGET SPEED

(71) Applicant: HONDA MOTOR CO., LTD., Tokyo (JP)

(72) Inventor: Masanori Takeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/456,914

(22) Filed: Mar. 13, 2017

(65) Prior Publication Data

US 2017/0259819 A1 Sep. 14, 2017

(30) Foreign Application Priority Data

Mar. 14, 2016 (JP) ................................. 2016-050128

(51) Int. Cl.
*B60W 30/16* (2012.01)
*B60W 10/20* (2006.01)
(Continued)

(52) U.S. Cl.
CPC ............ *B60W 30/16* (2013.01); *B60W 10/04* (2013.01); *B60W 10/18* (2013.01); *B60W 10/20* (2013.01);
(Continued)

(58) Field of Classification Search
None
See application file for complete search history.

(56) References Cited

U.S. PATENT DOCUMENTS

| 5,761,629 A * | 6/1998 | Gilling ............... B60K 31/0008 |
| | | 180/169 |
| 2017/0269602 A1* | 9/2017 | Nakamura ............ B60W 30/09 |
| 2017/0270799 A1* | 9/2017 | Takeda .................. G01S 17/936 |

FOREIGN PATENT DOCUMENTS

| JP | 2003-25868 A | 1/2003 |
| JP | 2009-78735 A | 4/2009 |

(Continued)

OTHER PUBLICATIONS

Office Action dated Nov. 7, 2017, issued in counterpart Japanese Application No. 2016-050128, with English machine translation. (6 pages).

*Primary Examiner* — Thomas G Black
*Assistant Examiner* — Ana D Thomas
(74) *Attorney, Agent, or Firm* — Westerman, Hattori, Daniels & Adrian, LLP

(57) ABSTRACT

A vehicle control system includes: a detection section that detects a presence and state of any nearby vehicles traveling in the vicinity of a vehicle; a speed generation section that generates a target speed of the vehicle based on a state of a benchmark vehicle from out of the nearby vehicles whose presence and state have been detected by the detection section, the benchmark vehicle being closest to the vehicle in a direction of progress from out of a first vehicle traveling ahead of the vehicle in a current lane in which the vehicle is traveling or a second vehicle traveling ahead of the vehicle in an adjacent lane adjacent to the current lane; and a travel control section that automatically controls at least acceleration and deceleration of the vehicle based on the target speed generated by the speed generation section.

11 Claims, 21 Drawing Sheets

(51) Int. Cl.
*B60W 30/095* (2012.01)
*B60W 10/04* (2006.01)
*B60W 10/18* (2012.01)
*B60W 30/12* (2006.01)
*B60W 30/18* (2012.01)

(52) U.S. Cl.
CPC .......... *B60W 30/095* (2013.01); *B60W 30/12* (2013.01); *B60W 30/162* (2013.01); *B60W 30/18163* (2013.01); *B60W 2520/10* (2013.01); *B60W 2540/10* (2013.01); *B60W 2540/12* (2013.01); *B60W 2540/18* (2013.01); *B60W 2550/30* (2013.01); *B60W 2550/306* (2013.01); *B60W 2720/10* (2013.01); *B60W 2750/30* (2013.01)

(56) References Cited

FOREIGN PATENT DOCUMENTS

| | | |
|---|---|---|
| JP | 2014-61792 A | 4/2014 |
| WO | 2016/017636 A1 | 2/2016 |

* cited by examiner

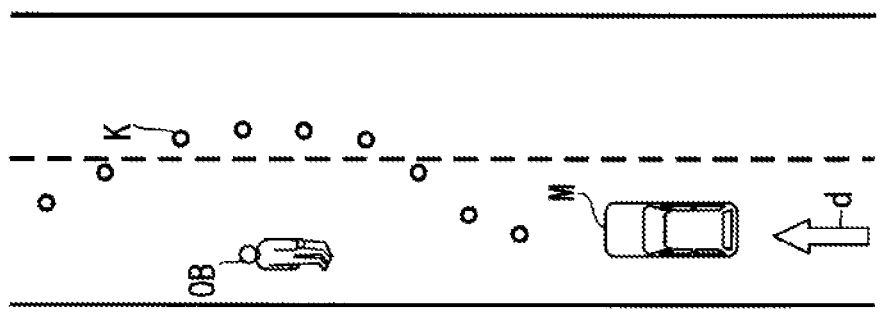
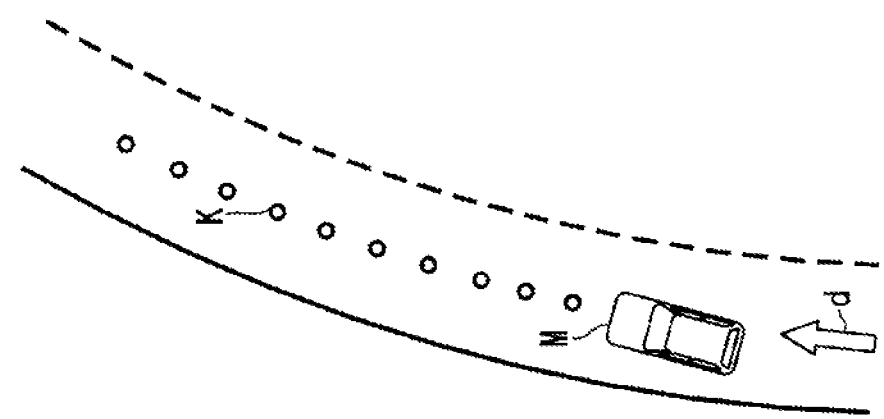
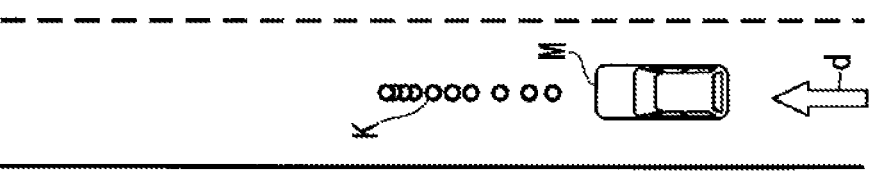
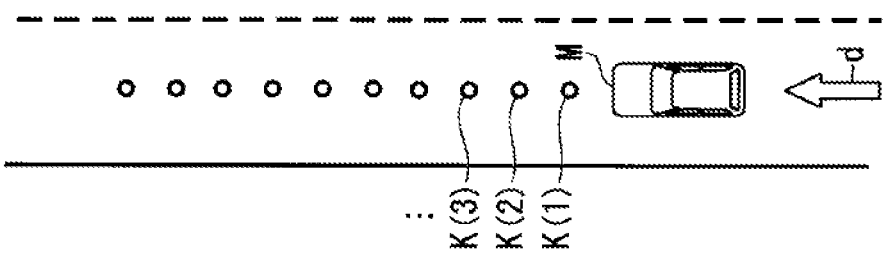

VEHICLE CONTROL SYSTEM, VEHICLE CONTROL METHOD, AND VEHICLE CONTROL PROGRAM FOR AUTOMATICALLY CONTROLLING VEHICLE BASED ON GENERATED TARGET SPEED

CROSS REFERENCES TO RELATED APPLICATIONS

The present application claims priority under 35 U.S.C. § 119 to Japanese Patent Application No. 2016-050128, filed Mar. 14, 2016, entitled "Vehicle Control System, Vehicle Control Method, and Vehicle Control Program." The contents of this application are incorporated herein by reference in their entirety.

BACKGROUND

1. Field

The present disclosure relates to a vehicle control system, a vehicle control method, and a vehicle control program.

2. Description of the Related Art

Recently, research is progressing in technology for automatically controlling either or both acceleration and deceleration, or steering, of a vehicle. A known drive support apparatus related to this field includes a support start section that starts support for lane changing based on input from an input device, a detection section that detects a relative distance and relative speed between a vehicle and another vehicle, a calculating section that calculates a collision risk degree relating to the other vehicle when the vehicle changes lanes based on the relative distance and the respective speed detected by the detection section, a first determination section that determines whether or not lane change is possible based on the relative distance, the relative speed, and the collision risk degree, a decision-making section that decides a target space for changing lanes based on the relative distance and the relative speed when the first determination section has determined that changing lanes is not possible, and a second determination section that determines whether or not the target space has sufficient space to enable lane changing, a setting section that sets a target speed toward a lane change standby position when the second determination section has determined that there is not sufficient space, and that sets a target speed toward a lane change possible position in cases in which there is sufficient space, and a control section that controls the speed of the vehicle so as to attain the target speed (see, for example, Japanese Unexamined Patent Application Publication No. 2009-78735).

However, this related technology can sometimes cause an occupant of the vehicle to feel a sense of unease during self-driving.

SUMMARY

The present application describes a vehicle control system, a vehicle control method, and a vehicle control program capable of achieving self-driving that feels safer.

A first aspect describes a vehicle control system including: a detection section that detects a presence and state of any nearby vehicles traveling in the vicinity of a vehicle; a speed generation section that generates a target speed of the vehicle based on a state of a benchmark vehicle from out of the nearby vehicles whose presence and state have been detected by the detection section, the benchmark vehicle being closest to the vehicle in a direction of progress from out of a first vehicle traveling ahead of the vehicle in a current lane in which the vehicle is traveling or a second vehicle traveling ahead of the vehicle in an adjacent lane adjacent to the current lane; and a travel control section that automatically controls at least acceleration and deceleration of the vehicle based on the target speed generated by the speed generation section.

A second aspect describes the vehicle control system according to the first aspect, further including: a virtual vehicle setting section that sets a first virtual vehicle traveling in the same state as the benchmark vehicle and by a side of the benchmark vehicle in the lane on the side in which the benchmark vehicle is not present from out of the current lane and the adjacent lane. The speed generation section generates a target speed of the vehicle based on the state of the benchmark vehicle and the state of the first virtual vehicle set by the virtual vehicle setting section.

A third aspect describes the vehicle control system according to the first or second aspect, wherein, in a case in which the vehicle changes lanes from the current lane to the adjacent lane, or in a case in which the vehicle is traveling straddling the current lane and the adjacent lane, the speed generation section generates a target speed of the vehicle based on a state of the benchmark vehicle.

A fourth aspect describes the vehicle control system according to the third aspect, further including: a setting section that, in a case in which the vehicle changes lanes from the current lane to the adjacent lane, sets a target area as a target for the vehicle to change lanes to the adjacent lane. When the vehicle changes lanes from the current lane to the adjacent lane, out of the nearby vehicles, the speed generation section treats a vehicle traveling immediately ahead of the target area as the second vehicle, and generates a target speed for the vehicle until the vehicle reaches the target area based on the state of the benchmark vehicle and a state of a third vehicle traveling immediately behind the target area.

A fifth aspect describes the vehicle control system according to the fourth aspect, further including: a lane change possibility determination section that determines whether or not it is possible for the vehicle to change lanes to the target area based on the target speed generated by the speed generation section. When the vehicle changes lanes from the current lane to the adjacent lane, in a case in which lane changing is determined by the lane change possibility determination section not to be possible using the target speed of the vehicle generated based on the state of the benchmark vehicle and a state of the third vehicle traveling immediately behind the target area, the speed generation section re-generates a target speed of the vehicle until the vehicle reaches the target area based on the state of the first vehicle, the state of the second vehicle, and the state of the third vehicle.

A sixth aspect describes the vehicle control system according to the fourth aspect, wherein, in a case in which the nearby vehicle traveling immediately behind the target area has not been detected by the detection section, the virtual vehicle setting section sets in the adjacent lane a second virtual vehicle traveling in the same state as, out of the nearby vehicles detected by the detection section, a fourth vehicle traveling immediately behind the vehicle. The speed generation section generates a target speed of the vehicle until the vehicle reaches the target area based on the state of the benchmark vehicle and the state of the second virtual vehicle set by the virtual vehicle setting section.

A seventh aspect describes the vehicle control system according to the third aspect, wherein, in a case in which the speed generation section generates a target speed of the vehicle so as to travel following the first vehicle, the speed generation section generates the target speed of the vehicle based on the state of the benchmark vehicle in a case in which the vehicle travels straddling the current lane and the adjacent lane in order to avoid an obstacle in the current lane.

An eighth aspect describes the vehicle control system according to the first aspect, wherein in a case in which the speed generation section generates a target speed of the vehicle so as to travel following the first vehicle, the speed generation section generates the target speed Of the vehicle based on a state of the benchmark vehicle.

A ninth aspect describes a vehicle control method performed by a vehicle computer, the vehicle control method including: detecting a presence and state of any nearby vehicles traveling in the vicinity of a vehicle; generating a target speed of the vehicle based on a state of a benchmark vehicle from out of the nearby vehicles whose presence and state have been detected, the benchmark vehicle being closest to the vehicle in a direction of progress from out of a first vehicle traveling ahead of the vehicle in a current lane in which the vehicle is traveling or a second vehicle traveling ahead of the vehicle in an adjacent lane adjacent to the current lane; and automatically controlling at least acceleration and deceleration of the vehicle based on the generated target speed.

A tenth aspect describes a vehicle control program that causes a vehicle computer to: detect a presence and state of any nearby vehicles traveling in the vicinity of a vehicle; generate a target speed of the vehicle based on a state of a benchmark vehicle from out of the nearby vehicles whose presence and state have been detected, the benchmark vehicle being closest to the vehicle in a direction of progress from out of a first vehicle traveling ahead of the vehicle in a current lane in which the vehicle is traveling or a second vehicle traveling ahead of the vehicle in an adjacent lane adjacent to the current lane; and automatically control at least acceleration and deceleration of the vehicle based on the generated target speed.

According to the first, ninth, and tenth aspects, the target speed of the vehicle is generated based on the state of the benchmark vehicle that, out of the first vehicle and the second vehicle, is closest to the vehicle in the direction of progress. This thereby enables self-driving that feels safer.

According to the second aspect, the first virtual vehicle is set traveling in the same state as the benchmark vehicle, by the side of the benchmark vehicle in the lane, out of the current lane and the adjacent lane, on the side in which the benchmark vehicle is not present. The target speed of the vehicle is generated based on the state of the benchmark vehicle and the state of the first virtual vehicle. This thereby enables self-driving that feels safer.

According to the third aspect, in a case in which the vehicle changes lanes from the current lane to the adjacent lane, or in a case in which the vehicle is traveling straddling the current lane and the adjacent lane, the target speed of the vehicle is generated based on the state of the benchmark vehicle. This thereby enables self-driving that feels even safer, adapted to the traveling state of the vehicle.

According to the fourth aspect, in a case in which the vehicle changes lanes from the current lane to the adjacent lane, the target area is set as a target for the vehicle to change lanes. Out of the nearby vehicles, a vehicle traveling immediately ahead of the target area is treated as the second vehicle. The target speed for the vehicle until the vehicle reaches the target area is generated based on the state of the benchmark vehicle and a state of a third vehicle traveling immediately behind the target area. This thereby enables self-driving that feels even safer when changing lanes.

According to the fifth aspect, determination is made as to whether or not it is possible for the vehicle to change lanes to the target area based on the target speed. When the vehicle changes lanes from the current lane to the adjacent lane, in a case in which it is determined that lane changing is not possible using the target speed of the vehicle generated based on the state of the benchmark vehicle and a state of the third vehicle traveling immediately behind the target area, a target speed of the vehicle until the vehicle reaches the target area is re-generated, based on the state of the first vehicle, the state of the second vehicle, and the state of the third vehicle. This thereby enables self-driving that feels even safer when changing lanes.

According to the sixth aspect, in a case in which a nearby vehicle traveling immediately behind the target area has not been detected, the second virtual vehicle running in the same state as, out of the nearby vehicles, the fourth vehicle traveling immediately behind the vehicle, is set in the adjacent lane. The target speed of the vehicle until the vehicle reaches the target area is generated based on the state of the benchmark vehicle and the state of the second virtual vehicle. This thereby enables self-driving that feels even safer when changing lanes.

According to the seventh aspect, in a case in which a target speed of the vehicle is generated so as to travel following the first vehicle, a target speed of the vehicle based on the state of the benchmark vehicle is generated in a case in which the vehicle travels straddling the current lane and the adjacent lane in order to avoid an obstacle in the current lane. This thereby enables self-driving that feels even safer when avoiding an obstacle.

According to the eighth aspect, in a case in which a target speed of the vehicle so as to travel following the first vehicle is generated, the target speed of the vehicle is generated based on the state of the benchmark vehicle. This thereby enables self-driving that feels even safer when following the first vehicle. The word "section" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIGS. 5A to 5D are diagrams illustrating an example of a course generated by a first course generation section.

DESCRIPTION OF THE PREFERRED EMBODIMENTS

Explanation follows regarding embodiments of a vehicle control system, vehicle control method, and vehicle control program of the present disclosure, with reference to the drawings.

First Embodiment
Vehicle Configuration

Figure 1:
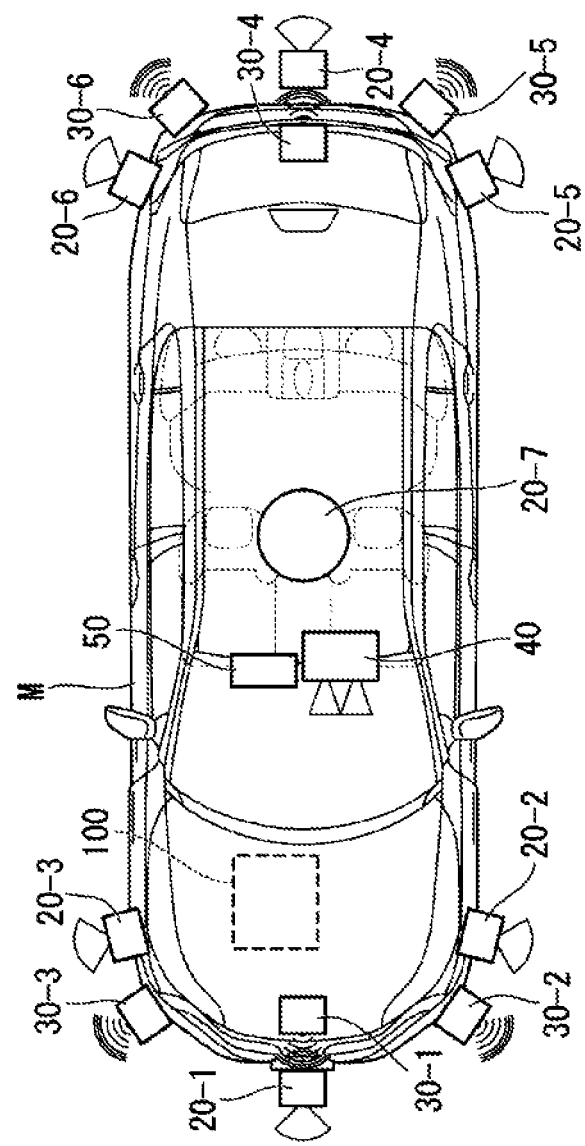
FIG. 1 is a diagram illustrating configuration elements in a vehicle installed with a vehicle control system of a first embodiment.

FIG. 1 is a diagram illustrating configuration elements of a vehicle (referred to below as the vehicle M) installed with a vehicle control system 100 according to a first embodiment of the present disclosure. The vehicle installed with the vehicle control system 100 is, for example, a two, three, or four-wheeled, automobile, and encompasses automobiles with a diesel or gasoline internal combustion engine or the like as a motive power source, electric vehicles with an electric motor as a motive power source, and hybrid vehicles including both an electric motor and an internal combustion engine as motive power sources. Such electric vehicles are driven using electric power discharged from a battery such as a secondary battery, a hydrogen fuel cell, a metal fuel cell, or an alcohol fuel cell.

As illustrated in FIG. 1, the vehicle M is installed with sensors such as finders 20-1 to 20-7, radars 30-1 to 30-6, and a camera 40, a navigation device 50, and the vehicle control system 100 described above. The finders 20-1 to 20-7 are, for example, Light Detection and Ranging, or Laser Imaging Detection and Ranging (LIDAR) sensors that measure scattering of illuminated light to measure the distance to a target. For example, the finder 20-1 is attached to a front grill, and the finders 20-2 and 20-3 are attached to side faces of the vehicle body, door mirrors, inside front lights, or in the vicinity of side lights. The finder 20-4 is attached to a trunk lid or the like, and the finders 20-5 and 20-6 are attached to side faces of the vehicle body or inside tail lights. The finders 20-1 to 20-6 described above have, for example, a detection region of approximately 150° in a horizontal direction. The finder 20-7 is, for example, attached to the roof. The finder 20-7 has, for example, a detection region of approximately 360° in the horizontal direction.

The radars 30-1 and 30-4 described above are, for example, long range millimeter wave radars that have a wider detection range than the other radars in the depth direction. The radars 30-2, 30-3, 30-5, and 30-6 are intermediate range millimeter wave radars that have a narrower detection range than the radars 30-1 and 30-4 in the depth direction. In the following, finders 20-1 to 20-7 are denoted simply as "finders 20" when no particular distinction is being made, and the radars 30-1 to 30-6 are denoted simply as "radars 30" when no particular distinction is being made. The radars 30 detect objects using a frequency-modulated continuous-wave (FM-CW) method, for example.

The camera 40 is, for example, a digital camera utilizing a solid-state imaging element such as a charge-coupled device (CCD) or a complementary metal-oxide-semiconductor (CMOS) element. The camera 40 is, for example, attached to an upper portion of the front, windshield or to the back face of the rear view mirror. The camera 40 periodically and repeatedly images ahead of the vehicle M, for example.

Note that the configuration illustrated in FIG. 1 is merely an example, and parts of this configuration may be omitted, and other configurations may be added.

Figure 2:
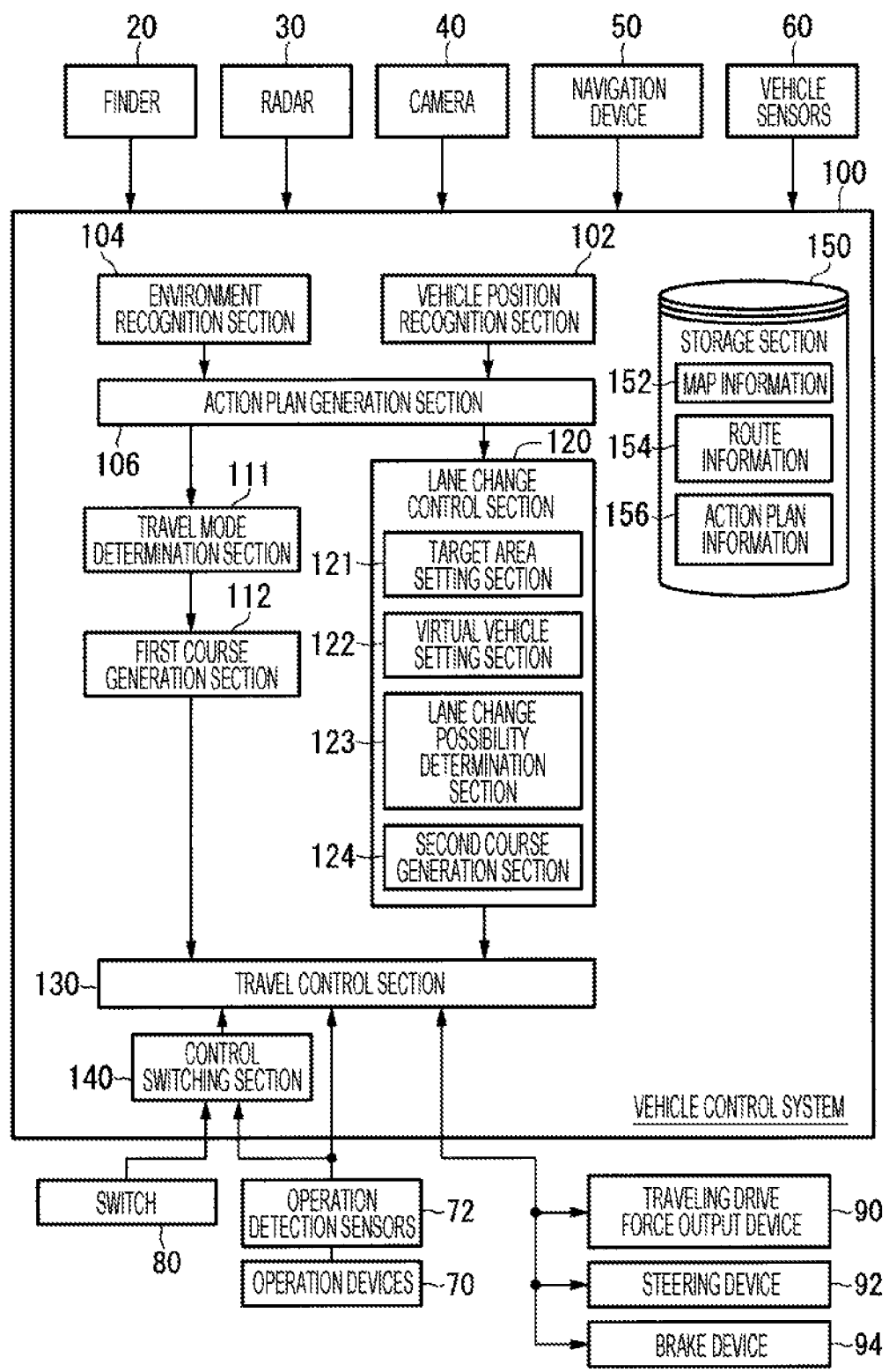
FIG. 2 is a functional configuration diagram of a vehicle, focusing on the vehicle control system according to the first embodiment.

FIG. 2 is a configuration diagram of the vehicle M, focusing on the vehicle control system 100 according to the first embodiment. In addition to the finders 20, the radars 30, and the camera 40, the vehicle M includes the navigation device 50, vehicle sensors 60, operation devices 70, operation detection sensors 72, a switch 80, a traveling drive force output device 90, a steering device 92, a brake device 94, and the vehicle control system 100. These devices and equipment are connected together through multiplex communication lines or serial communication lines such as Controller Area Network (CAN) communication lines, a wireless communications network, or the like.

The navigation device 50 includes a global navigation satellite system (GNSS) receiver and map information (navigation map), a touch-panel display device that functions as a user interface, a speaker, a microphone, and the like. The navigation device 50 identifies the position of the vehicle M using the GNSS receiver, and derives a route from this position to a destination designated by a user. The route derived by the navigation device 50 is stored in a storage section 150 as route information 154. The position of the vehicle M may be identified, or supplemented, by using an inertial navigation system (INS) that utilizes output from the vehicle sensors 60. While the vehicle control system 100 is executing a manual driving mode, the navigation device 50 provides guidance using sounds and navigational display of the route to the destination. Note that configuration for identifying the position of the vehicle M may be provided independently of the navigation device 50. The navigation device 50 may be implemented, for example, by one function of a terminal device such as a smartphone or a tablet terminal belonging to a user. In such cases, information is exchanged using wireless or wired communication between the terminal device and the vehicle control system 100.

The vehicle sensors 60 include a vehicle speed sensor that detects vehicle speed, an acceleration sensor that detects acceleration, a yaw rate sensor that detects angular acceleration about a vertical axis, and a direction sensor that detects the orientation of the vehicle M.

In cases in which the vehicle M is an automobile with an internal combustion engine as a motive power source, the traveling drive force output device 90 includes, for example, an engine, and an engine Electronic Control Unit (ECU) that controls the engine. In cases in which the vehicle M is an electric vehicle with an electric motor as a motive power source, the traveling drive force output device 90 includes a traction motor, and a motor ECU that controls the motor. In cases in which the vehicle M is a hybrid vehicle, the traveling drive force output device 90 includes an engine and an engine ECU, and a traction motor and a motor ECU. When the traveling drive force output device 90 includes only an engine, the engine ECU adjusts an engine throttle opening amount, a shift level, or the like, according to information input from a travel control section 130, described later, so as to output traveling drive force (torque) for vehicle travel. When the traveling drive force output device 90 includes only a traction motor, the motor ECU adjusts the duty ratio of a PWM signal applied to the traction motor according to information input from the travel control section 130 so as to output the traveling drive force described above. When the traveling drive force output device 90 includes an engine and a traction motor, both the engine ECU and the motor ECU work together in coordination with each other according to information input from the travel control section 130 so as to output the traveling drive force.

The steering device 92 includes, for example, an electric motor, a steering torque sensor, and a steering angle sensor. The electric motor, for example, applies force to a rack and pinion mechanism or the like to change the orientation of a steering wheel. The steering torque sensor, for example, detects, as steering torque (steering force), twisting of a torsion bar when a steering wheel is operated. The steering angle sensor, for example, detects a steering wheel angle (or actual steering angle). The steering device 92 drives the electric motor according to information input from the travel control section 130 so as to change the direction of the steering wheel.

The brake device 94 is, for example, an electric servo brake device that includes a brake caliper, a cylinder that transmits hydraulic pressure to the brake caliper, an electric motor that causes the cylinder to generate hydraulic pressure, and a braking controller. The braking controller of the electric servo brake device is configured to control the electric motor according to information input from the travel control section 130, and to output brake torque corresponding to a braking operation to each wheel. The electric servo brake device may include a backup mechanism that transmits hydraulic pressure generated by operation of the brake pedal to the cylinder through a master cylinder. Note that the brake device 94 is not limited to the electric servo brake device explained above, and may be an electronically controlled hydraulic brake device. The electronically controlled hydraulic brake device controls an actuator according to information input from the travel control section 130 so as to transmit hydraulic pressure from the master cylinder to the cylinder The brake device 94 may also include a regenerative brake The traction motor that may be included in the traveling drive force output device 90.

The operation devices 70 include, for example, an accelerator pedal, a steering wheel, a brake pedal, and a shift lever. Operation detection sensors 72 that detect the presence or absence of operation, and an amount of operation, by a driver are attached to the operation devices 70. The operation detection sensors 72 include, for example, an accelerator opening sensor, a steering torque sensor, a brake sensor, and a shift position sensor. The operation detection sensors 72 output the degree of accelerator opening, steering torque, brake depression amount, shift position, and the like to the travel control section 130 as detection results. Note that, alternatively, the detection results of the operation detection sensors 72 may be output directly to the traveling drive force output device 90, the steering device 92, or the brake device 94.

The switch 80 is a switch operated by a driver or the like. The switch 80 may be a mechanical switch installed to the steering wheel, garnish (dashboard), or the like, or may be a graphical user interface (GUI) switch provided to the touch-panel of the navigation device 50. The switch 80 receives operation from a driver or the like, and generates a control mode designation signal designating a control mode of the travel control section 130 to be either a self-driving mode or a manual driving mode, and outputs the control mode designation signal to a control switching section 140. The self-driving mode mentioned above is a drive mode for traveling in a state in which a driver does not perform operations (or operates by a smaller amount, or less frequently, than in the manual driving mode). More specifically, the self-driving mode is a driving mode in which some or all of the traveling drive force output device 90, the steering device 92, and the brake device 94 are controlled based on an action plan.

Vehicle Control System

Explanation follows regarding the vehicle control system 100. The vehicle control system 100 includes, for example, a vehicle position recognition section 102, an environment recognition section 104, an action plan generation section 106, a travel mode determination section 111, a first course generation section 112, a lane change control section 120, the travel control section 130, the control switching section 140, and the storage section 150.

Some or all of the vehicle position recognition section 102, the environment recognition section 104, the action plan generation section 106, the travel mode determination section 111, the first course generation section 112, the lane change control section 120, the travel control section 130, and the control switching section 140 may be implemented by a processor, such as a central processing unit (CPU), executing a program. Moreover, some or all out of these sections may be implemented by hardware using Large-Scale Integration (LSI), Application Specific Integrated Circuits (ASIC), or the like.

The storage section 150 may be implemented by a non-volatile storage medium such as read-only memory (ROM), flash memory, a hard disk drive (HDD), or the like, or by a volatile storage medium such as random-access memory (RAM), resistors, or the like. The program executed by the processor may be pre-stored on the non-volatile storage medium of the storage section 150, or may be downloaded from an external device using onboard internet equipment or the like. The program may also be installed in the storage section 150 by loading a portable storage medium stored with the program into a drive device, not illustrated in the drawings.

The vehicle position recognition section 102 recognizes the lane in which the vehicle M is traveling (lane of travel) and the relative position of the vehicle M with respect to the lane of travel based on map information 152 stored in the storage section 150, and information input from the finders 20, the radars 30, the camera 40, the navigation device 50, or the vehicle sensors 60. The map information 152 is, for example, map information that is more precise than the navigation map included in the navigation device 50, and includes information relating to lane centers, information relating to lane boundaries, or the like. More specifically, the map information 152 includes information such as road information, traffic restriction information, address information (addresses and postal codes), facilities information, and telephone numbers. The road information includes information indicating road types, such as highways, toll roads, national routes, and local routes, and information such as the number of lanes, the width of each lane, the gradient of the road, the position of the road (three-dimensional coordinates indicating latitude, longitude, and altitude), lane curvature, lane merges and junction points, road signs provided along the road, and the like. The traffic restriction information includes information relating to lane closures due to roadworks, traffic accidents, traffic congestion, and the like.

Figure 3:
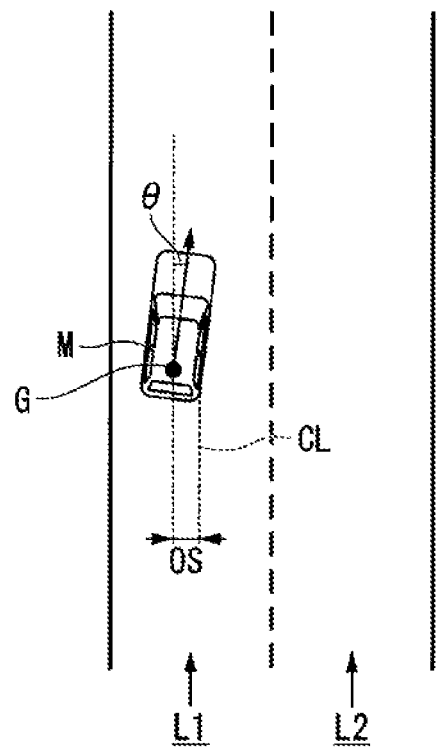
FIG. 3 is a diagram illustrating how a relative position of a vehicle with respect to a lane of travel is recognized by a vehicle position recognition section.

FIG. 3 is a diagram illustrating the manner in which the relative position of the vehicle M with respect to a lane of travel L1 is recognized by the vehicle position recognition section 102. The vehicle position recognition section 102 recognizes, for example, a deviation OS of a reference point G (for example, the center of mass) of the vehicle M from a lane of travel center CL, and an angle θ formed between the direction of progress of the vehicle M and a line parallel to the lane of travel center CL, as the relative position of the vehicle M with respect to the lane of travel L1. Note that, alternatively, the vehicle position recognition section 102 may recognize the position of the vehicle M reference point with respect to either of the side edges of the current lane L1 as the relative position of the vehicle M with respect to the lane of travel.

The environment recognition section 104 recognizes states such as the position, speed, and acceleration of nearby vehicles based on information input from the finders 20, the radars 30, the camera 40, and the like. In the present embodiment, a "nearby vehicles" refers to a vehicle traveling in the vicinity of the vehicle M, and traveling in the same direction as the vehicle M. The positions of nearby vehicles may be indicated by representative points such as the centers of mass or corners of the other vehicles, or may be indicated by regions expressed by the outlines of the other vehicles. The "state" of a nearby vehicle may include the acceleration of the nearby vehicle, and whether or not the nearby vehicle is changing lanes (or attempting to change lanes), based on information from the various devices described above. The environment recognition section 104 may also recognize the positions of guard rails, utility poles, parked vehicles, pedestrians, and other objects, in addition to nearby vehicles. The environment recognition section 104 is an example of a "detection section".

The action plan generation section 106 generates an action plan for specific road sections. Specific road sections are, for example, road sections where the route derived by the navigation device 50 passes through toll roads such as expressways. Note that there is no limitation thereto, and the action plan generation section 106 may generate action plans for any suitable road sections.

The action plan is, for example, configured by plural events that are sequentially executed. Events include, for example, a deceleration event in which the vehicle M is decelerated, an acceleration event in which the vehicle M is accelerated, a lane keep event in which the vehicle M is driven so as to not deviate from the lane of travel, a lane change event in which the lane of travel is changed, a passing event in which the vehicle M is caused to overtake a vehicle in front, a junction event in which the vehicle M is caused to change to a desired lane at a junction point or the vehicle M is driven so as to not deviate from the current lane of travel, and a merge event in which the vehicle M is accelerated or decelerated at a lane merging point and the lane of travel is changed. For example, in cases in which a junction (junction point) is present on a toll road (for example, an expressway), it is necessary for the vehicle control system 100 to change lanes such that the vehicle M progresses in the direction of the destination, or to maintain its lane, in the self-driving mode. Accordingly, in cases in which the map information 152 is referenced and a junction is determined to be present on the route, the action plan generation section 106 sets a lane change event between the current position (coordinate) of the vehicle M and the position (coordinate) of the junction in order to change lanes into a desired lane that enables progression in the direction of the destination. Note that information indicating the action plan generated by the action plan generation section 106 is stored in the storage section 150 as action plan information 156.

Figure 4:
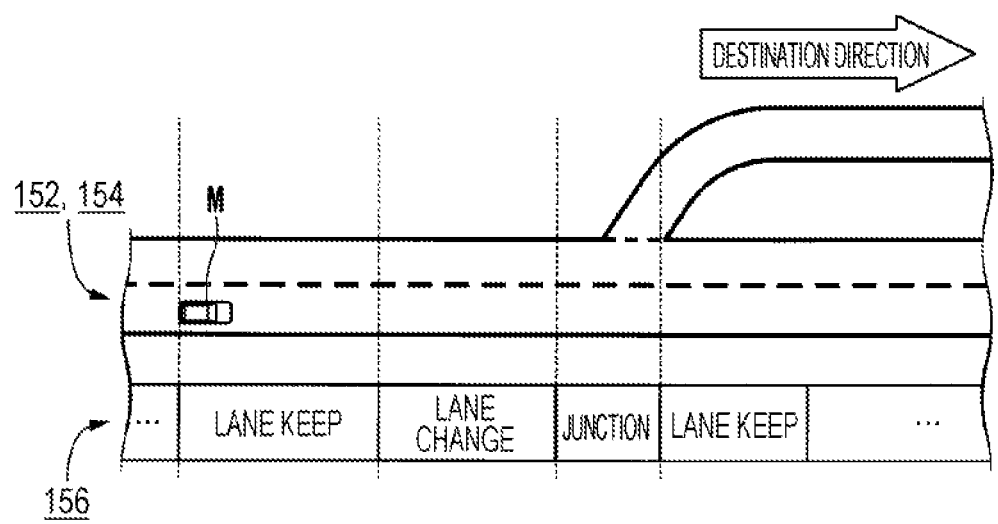
FIG. 4 is a diagram illustrating an example of an action plan generated for specific road sections.

FIG. 4 is a diagram illustrating an example of an action plan generated for given road sections. As illustrated in the drawing, the action plan generation section 106 classifies situations that arise when traveling along a route to a destination, and generates an action plan such that events adapted to each situation are executed. Note that the action plan generation section 106 may dynamically change the action plan according to changes in the situation of the vehicle M.

The action plan generation section 106 may, for example, change (update) the generated action plan based on the state of the environment recognized by the environment recognition section 104. Generally speaking, the state of the environment changes constantly while the vehicle is traveling. In particular, when the vehicle M is traveling along a road with plural lanes, the relative distances to other vehicles change. For example, if a vehicle in front brakes suddenly and decelerates, or a vehicle traveling in an adjacent lane enters in front of the vehicle M, it is necessary for the vehicle M to change the speed and lane appropriately as it travels, in order to adapt to the behavior of the vehicle in front or the behavior of the vehicle in the adjacent lane. Accordingly, the action plan generation section 106 may change events set for each control section according to the changing state of the environment, as described above.

Specifically, when the speed of another vehicle recognized by the environment recognition section 104 during vehicle travel exceeds a threshold value, or when the movement direction of another vehicle traveling in a lane adjacent to the lane of the vehicle M is heading toward the lane of the vehicle M, the action plan generation section 106 changes the event set for the driving road section in which the vehicle M is scheduled to travel. For example, in a case in which events are set so as to execute a lane change event after a lane keep event, if, during the lane keep event, it is found from the recognition results of the environment recognition section 104 that a vehicle is approaching from the rear in the lane change target lane at a speed of the threshold value or greater, the action plan generation section 106 changes the event immediately following the lane keep event from a lane change to a deceleration event, a lane keep event, or the like. As a result, the vehicle control system 100 is capable of causing the vehicle M to travel in a safe manner automatically, even when a change occurs in the state of the environment.

Lane Keep Event

When a lane keeping event included in the action plan is executed by the travel control section 130, the travel mode determination section 111 determines a travel mode that is one out of constant speed travel, following travel, decelerating travel, curve travel, and obstacle avoidance travel. For example, the travel mode determination section 111 determines the travel mode to be constant speed travel in cases in which another vehicle is not present ahead of the vehicle. The travel mode determination section 111 determines the travel mode to be following travel in cases which, for example, a vehicle in front is to be followed. The vehicle in front is a vehicle traveling ahead of the vehicle M in the lane in which the vehicle 4 is traveling. The vehicle in front is an example of a "first vehicle". Moreover, the travel mode determination section 111 determines the travel mode to be decelerating travel in cases in which deceleration of the vehicle in front has been recognized by the environment recognition section 104, or when executing an event such as stopping or parking. The travel mode determination section 111 determines the travel mode to be curve travel in cases in which the environment recognition section 104 has recognized that the vehicle M has come to a curved road. The travel mode determination section 111 determines the travel mode to be obstacle avoidance travel in cases in which an obstacle ahead of the vehicle M has been recognized by the environment recognition section 104.

The first course generation section 112 generates a course based on the travel mode determined by the travel mode determination section 111. A course is a collection of points (a path) obtained by sampling future target positions that are anticipated to be reached at specific time intervals when the vehicle M is traveling based on the travel mode determined by the travel mode determination section 111. These points are also referred to as course points below.

FIG. 5A to FIG. 5D are diagrams illustrating examples of courses generated by the first course generation section 112. As illustrated in FIG. 5A, for example, the first course generation section 112 sets the future target positions K (1), K (2), K (3), . . . , as the course of the vehicle M at each time a specific amount of time Δt has passed, starting from the current time, and using the current position of the vehicle M as a reference. In the following explanation, these target positions are denoted simply as "target positions K" when no particular distinction is being made. The number of target positions K is set according to, for example, a target time T. For example, when the target time T is set to 5 seconds, the first course generation section 112 sets target positions K on a central line in the lane of travel at intervals of the specific amount of time Δt (for example, 0.1 seconds) for the 5 seconds, and determines arrangement intervals for these plural target positions K based on the travel mode. The first course generation section 112 may, for example, derive a central line of the lane of travel from information related to the width and the like of the lane included in the map information 152, or the first course generation section 112 may acquire the central line of the lane of travel from the map information 152 in cases in which it is included in the map information 152 in advance.

For example, as illustrated in FIG. 5A, in cases in which the travel mode has been determined to be constant speed travel by the travel mode determination section 111 described above, the first course generation section 112 generates the course by setting the plural target positions K at equal intervals. As illustrated in FIG. 5B, in cases in which the travel mode has been determined to be decelerating travel by the travel mode determination section 111 (including cases in which the vehicle in front has decelerated during following travel), the first course generation section 112 generates the course by setting wider intervals between target positions K the earlier the times of arrival and setting tightly spaced intervals between target positions K the later the times of arrival. The travel control section 130, described later, thereby decelerates the vehicle M due to the target positions K having later times of arrival for the vehicle M being arranged relatively nearer to the current position of the vehicle M.

As illustrated in FIG. 5C, in cases in which the road is a curved road, the travel mode is determined to be curve travel by the travel mode determination section 111. In such cases the first course generation section 112, for example, generates a course by arranging plural target positions K in accordance with the curvature of the road while varying the lateral positions (lane width direction positions) of the target positions K with respect to the direction of progress of the vehicle M. As illustrated in FIG. 5D, in cases in which an obstacle OB such as a person or a stationary vehicle is present in the road ahead of the vehicle M, the travel mode determination section 111 determines the travel mode to be obstacle avoidance travel. In such cases, the first course generation section 112 generates a course by arranging the plural target positions K so as to travel avoiding the obstacle OB.

Lane Change Event

The lane change control section 120 performs control in order for the travel control section 130 to execute a lane change event included in the action plan. The lane change control section 120 includes, for example, a target area setting section 121, a virtual vehicle setting section 122, a lane change possibility determination section 123, and a second course generation section 124. Note that the lane change control section 120 is not limited to lane change events, and may also perform processing when a junction event or merge event is executed by the travel control section 130, described later.

The target area setting section 121 sets a target area TA in order to change lanes to a lane (adjacent lane) along which the vehicle should proceed. The target area TA is, for example, a relative position set between two selected nearby vehicles in the adjacent lanes. In the following explanation out of the two nearby vehicles traveling in the adjacent lane, a vehicle travelling immediately ahead of the target area TA is referred to as a "front reference vehicle mB". Moreover, a vehicle travelling immediately behind the target area TA is referred to as a "rear reference vehicle mC". The front reference vehicle mB is an example of a "second vehicle", and the rear reference vehicle mC is an example of a "third vehicle".

The target area setting section 121 may set the target area TA between a virtual vehicle set by the virtual vehicle setting section 122, described later, and an identified vehicle. The target area setting section 121 may also set the target area TA between plural virtual vehicles set by the virtual vehicle setting section 122 when no vehicles can be identified. Setting of the virtual vehicles will be described later.

Note that the target area setting section 121 may set plural target areas TA in the adjacent lane L2, and select one (or a specific number of) target area(s) TA from out of the plural target areas TA. For example, the target area setting section 121 may set respective target areas TA to the rear of the rear reference vehicle (between the rear reference vehicle and a vehicle present behind the rear reference vehicle), ahead of the front reference vehicle (between the front reference vehicle and a vehicle present ahead of the front reference vehicle), and between the front reference vehicle and the rear reference vehicle, and then select one target area TA from these plural target areas TA. In order to simplify the explanation of the present embodiment, explanation follows regarding a case in which the target area setting section 121 sets a single target area TA between the front reference vehicle (or a virtual vehicle treated as the front reference vehicle) and the rear reference vehicle (or a virtual vehicle treated as the rear reference vehicle).

The virtual vehicle setting section 122 compares the respective positions (relative positions with respect to the vehicle M) of a front reference vehicle traveling immediately ahead of the target area TA set by the target area setting section 121, and a vehicle traveling immediately ahead of the vehicle M in the same lane as the vehicle M is traveling in (referred to below as the "vehicle in front"), and sets a virtual vehicle. The virtual vehicle is a virtual simulation of the vehicle (a benchmark vehicle) closer to the vehicle M in the direction of vehicle progress (the x direction in FIG. 6, described later), and is set in the lane on the side on which the benchmark vehicle is not present. In the following explanation, the vehicle in front, the front reference vehicle, and the rear reference vehicle are respectively annotated with the reference numerals mA, mB, and mC.

For example, in cases in which the vehicle in front mA is closest to the vehicle M out of the vehicle in front mA and the front reference vehicle mB in the direction of vehicle progress, the virtual vehicle setting section 122 sets a virtual vehicle vmA, this being a virtual simulation of the vehicle in front mA, in the adjacent lane by the side of the vehicle in front mA. Moreover, in cases in which the front reference vehicle mB is closest to the vehicle M out of the vehicle in front mA and the front reference vehicle mB in the direction of vehicle progress, the virtual vehicle setting section 122 sets a virtual vehicle vmB, this being a virtual simulation of the front reference vehicle mB, in the current lane by the side of the front reference vehicle mB. When this is performed, the virtual vehicle setting section 122 sets the virtual vehicle (vmA or vmB) as if it were traveling at the same speed as the benchmark vehicle (the vehicle in front mA or front reference vehicle mB).

Figure 6:
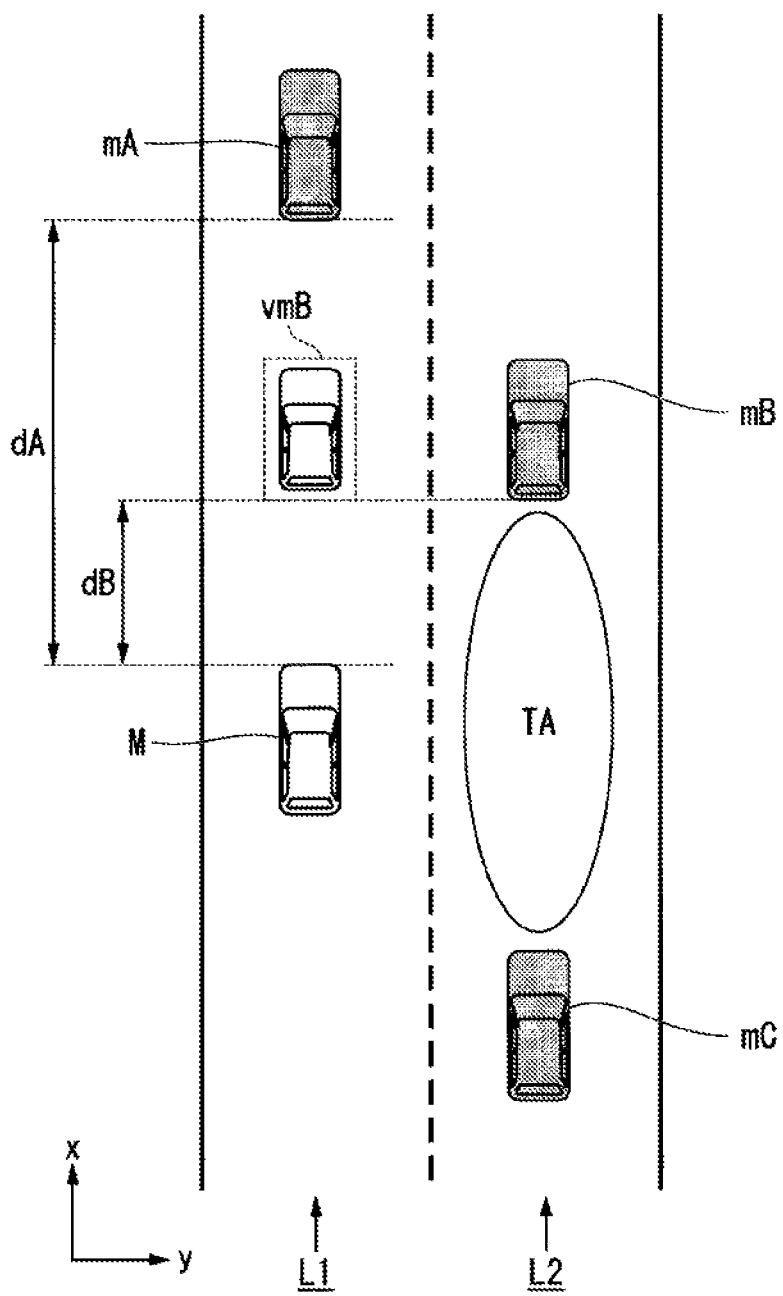
FIG. 6 is a diagram illustrating an example of a situation in which a virtual vehicle is set.

FIG. 6 is a diagram illustrating an example of a situation in which a virtual vehicle is set. In FIG. 6, L1 and L2 respectively indicate the current lane and the adjacent lane. As illustrated in FIG. 6, the virtual vehicle setting section 122 compares a distance dA in the x direction from a reference position of the vehicle M (a front end of the vehicle M in FIG. 6) to a reference position of the vehicle in front (a rear end of the vehicle in front mA in FIG. 6) against a distance dB in the x direction from the reference position of the vehicle M to a reference position of the front reference vehicle mB (a rear end of the front reference vehicle mB in FIG. 6), and selects the vehicle closest to the vehicle M as the benchmark vehicle. In the example illustrated in FIG. 6, the distance dB is shorter than the distance dA, and so the front reference vehicle mB is selected as the benchmark vehicle. The virtual vehicle setting section 122 sets the virtual vehicle vmB, this being a virtual simulation of the front reference vehicle mB, in the current lane L1 by the side of the front reference vehicle mB. "By the side" refers to, for example, a position projected from the benchmark vehicle at the center of the lane on the side in which the benchmark vehicle is not present. In the example illustrated in FIG. 6, the virtual vehicle setting section 122 sets the virtual vehicle vmB such that the rear end of the front reference vehicle mB and the rear end of the virtual vehicle vmB are at the same position in the x direction in FIG. 6.

When the virtual vehicle vmB is set as illustrated in the example of FIG. 6, similarly to in cases in which the virtual vehicle vmB is not set, the target area setting section 121 sets the target area TA between the front reference vehicle mB and the rear reference vehicle mC.

Figure 7:
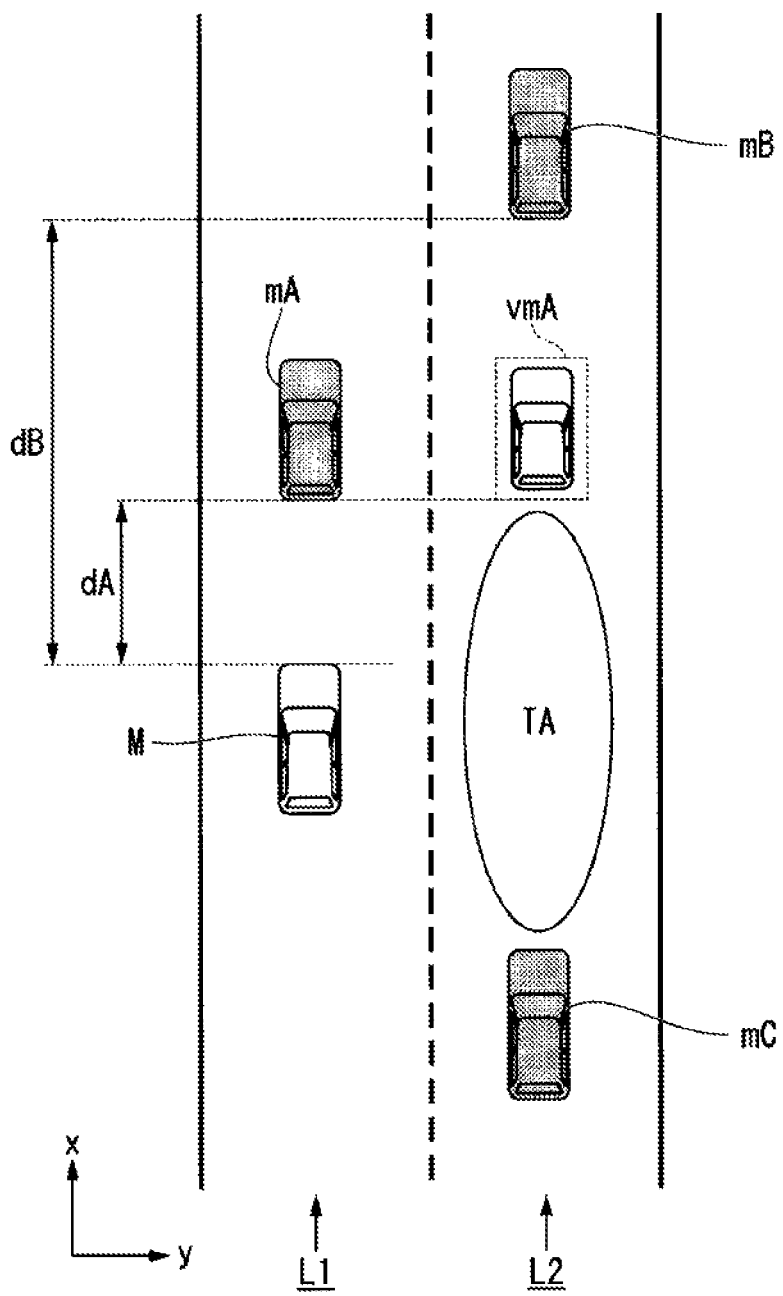
FIG. 7 is a diagram illustrating another example of a situation in which a virtual vehicle is set.

FIG. 7 is a diagram illustrating another example of a situation in which a virtual vehicle is set. In the example of FIG. 7, the distance dA is shorter than the distance dB, and so the vehicle in front mA is selected as the benchmark vehicle. The virtual vehicle setting section 122 sets a virtual vehicle vmA, this being a virtual simulation of the vehicle in front mA, in the adjacent lane L2 by the side of the vehicle in front mA. In the example illustrated in FIG. 7, the virtual vehicle setting section 122 sets the virtual vehicle vmA such that the rear end of the front reference vehicle mA and the rear end of the virtual vehicle vmA are at the same position in the x direction in FIG. 7.

When the virtual vehicle vmA is set as illustrated in the example of FIG. 7, the target area setting section 121 sets the target area TA between the virtual vehicle vmA set in the adjacent lane L2 by the virtual vehicle setting section 122, and the rear reference vehicle mC. However, if the virtual vehicle vmA is not set, the target area setting section 121 sets the target area TA between the front reference vehicle mB and the rear reference vehicle mC.

Note that when the vehicle in front mA and the front reference vehicle mB are at the same position as each other in the x direction (positions at the same distance from the vehicle M), the virtual vehicle setting section 122 may select the vehicle with the slower speed as the benchmark vehicle. Moreover, when the distance between the vehicle in front mA and the front reference vehicle mB is within a specific range, the virtual vehicle setting section 122 may treat the vehicles as being at the same position as each other, and, similarly to above, select the vehicle with the slower speed as the benchmark vehicle.

When there is no vehicle traveling behind the vehicle M in the adjacent lane, and such a vehicle cannot be identified when the target area setting section 121 is setting the target area TA, the virtual vehicle setting section 122 sets a virtual vehicle, this being a virtual simulation of a vehicle (referred to below as the vehicle behind) traveling immediately behind the vehicle M, in the adjacent lane as a simulated rear reference vehicle mC. In the following, the vehicle behind is annotated with the reference numeral mD. For example, the virtual vehicle setting section 122 sets a virtual vehicle vmD, this being a virtual simulation of the vehicle behind mD, in the adjacent lane by the side of the vehicle behind mD in a state in which the virtual vehicle vmD has the same speed as the vehicle behind mD. The vehicle behind is an example of a "fourth vehicle".

Figure 8:
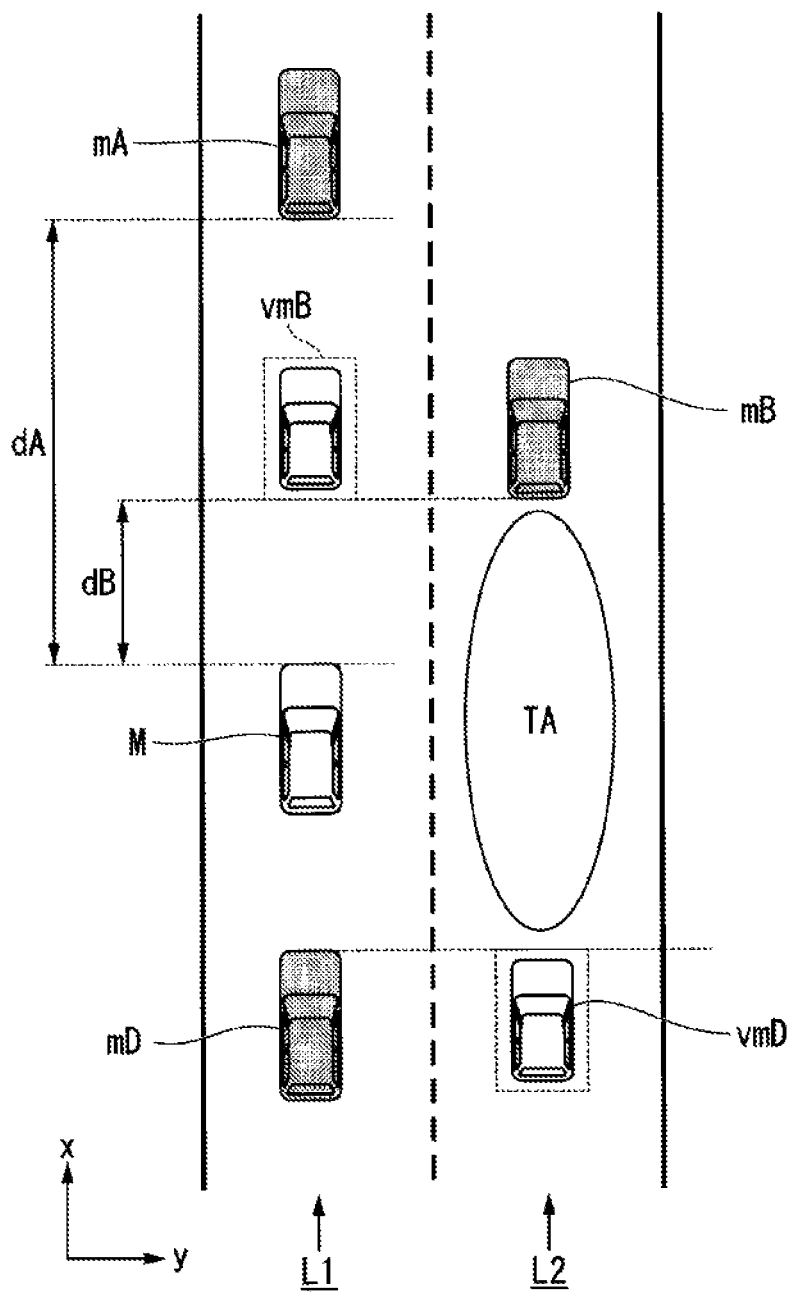
FIG. 8 is a diagram illustrating another example of a situation in which a virtual vehicle is set.

FIG. 8 is a diagram illustrating another example of a situation in which a virtual vehicle is set. As illustrated in FIG. 8, similarly to in the setting method for the front reference vehicle mB described above, the virtual vehicle setting section 122 sets the virtual vehicle vmD, this being a virtual simulation of the vehicle behind mD, in the adjacent lane L2 by the side of the vehicle behind mD. In the example illustrated in FIG. 8, the virtual vehicle setting section 122 sets the virtual vehicle vmD such that the front end of the vehicle behind mD and the front end of the virtual vehicle vmD are at the same position as each other in the x direction.

When the virtual vehicle vmD has been set as illustrated in the example of FIG. 8, the target area setting section 121 sets the target area TA between the front reference vehicle mB and the virtual vehicle vmD set in the adjacent lane L2 by the virtual vehicle setting section 122.

When neither a rear reference vehicle mC nor a vehicle behind mD cannot be identified when the target area setting section 121 is setting the target area TA, the virtual vehicle setting section 122 may set a virtual vehicle vmC, this being a virtual simulation of the non-existent rear reference vehicle mC, in a specific state at an outer limit of a recognition region for nearby vehicles by the environment recognition section 104. Namely, the virtual vehicle setting section 122 sets a specific virtual vehicle when neither a rear reference vehicle mC nor a vehicle behind mD can be identified when the target area setting section 121 is setting the target area TA. The recognition region is, for example, the extent of the range in which nearby vehicles can be recognized as objects by the finders 20, the radars 30, and the camera 40. Moreover, the "outer limit" is the boundary between the recognition region and a non-recognition region.

Figure 9:
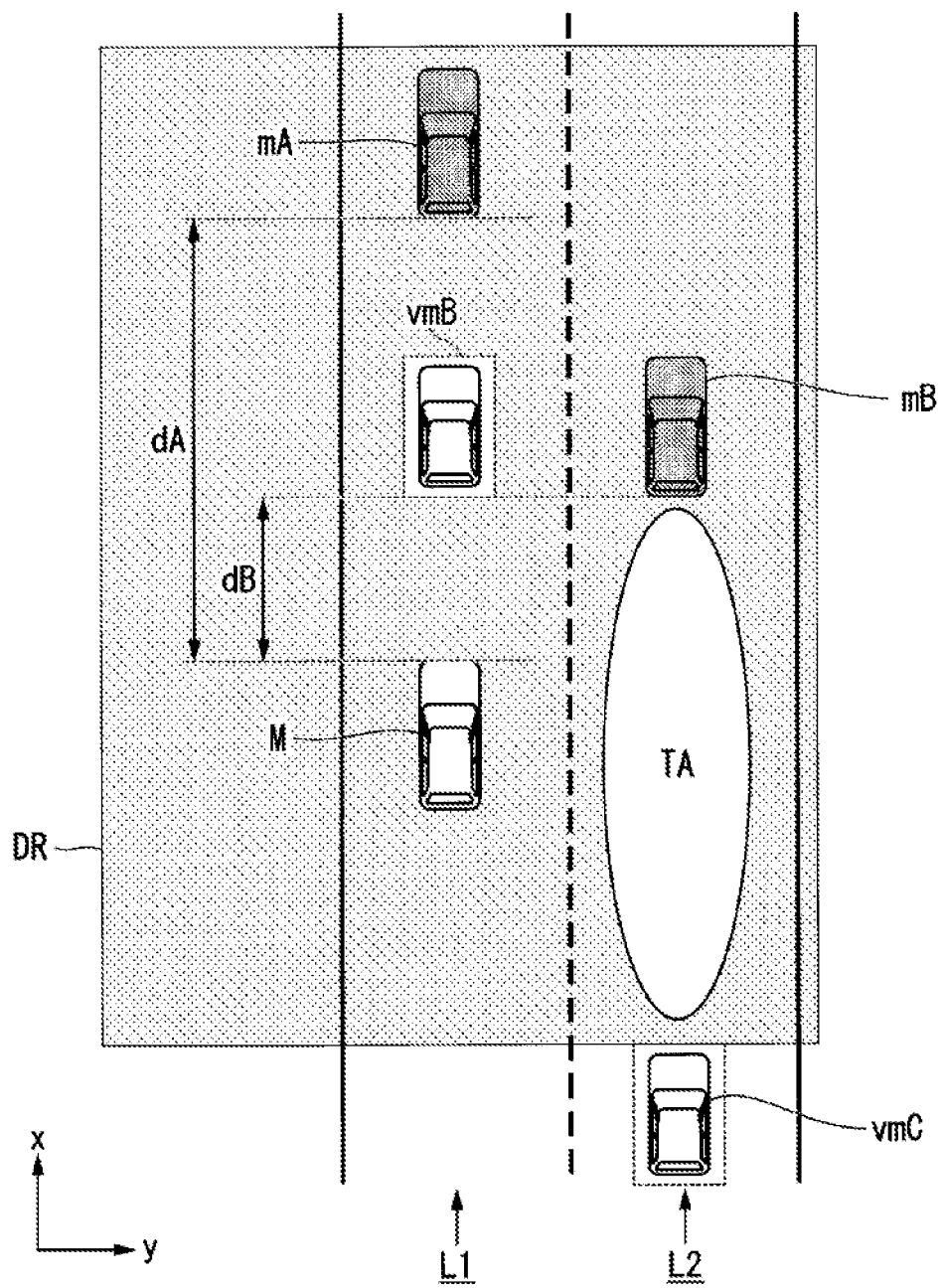
FIG. 9 is a diagram illustrating another example of a situation in which a virtual vehicle is set.

FIG. 9 is a diagram illustrating another example of a situation in which a virtual vehicle is set. As seen from a viewpoint above the vehicle, the virtual vehicle setting section 122 may set a virtual vehicle vmC, this being a virtual simulation of a rear reference vehicle mC, at a position where the region of the adjacent lane L2 overlaps with the outer limit of a recognition region DR to the rear as viewed from the vehicle M (namely, the adjacent lane to the rear of the vehicle M). When this is performed, the virtual vehicle setting section 122 for example sets the virtual vehicle vmC in a state having a maximum anticipated speed.

When the virtual vehicle vmC has been set as in the example of FIG. 9, the target area setting section 121 sets the target area TA between the front reference vehicle mB and the virtual vehicle vmC set in the adjacent lane L2 by the virtual vehicle setting section 122.

Note that the virtual vehicle vmD, this being a virtual simulation of the vehicle behind mD described above, and the virtual vehicle vmC, this being a virtual simulation of a rear reference vehicle mC, are treated in the same way as the rear reference vehicle mC when the target area setting section 121 sets the target area TA.

The following explanation lists examples of patterns for setting the target area TA. For example, the target area setting section 121 sets the target area TA between the virtual vehicle vmA and the rear reference vehicle mC when only a virtual vehicle vmA based on the vehicle in front mA has been set by the virtual vehicle setting section 122.

Moreover, the target area setting section 121 sets the target area TA between the front reference vehicle mB and the rear reference vehicle mC when only a virtual vehicle vmB based on the front reference vehicle mB has been set by the virtual vehicle setting section 122.

Moreover, the target area setting section 121 sets the target area TA between the front reference vehicle mB and the virtual vehicle vmD when only a virtual vehicle vmD based on the vehicle behind mD has been set by the virtual vehicle setting section 122.

Moreover, the target area setting section 121 sets the target area TA between the front reference vehicle mB and the virtual vehicle vmC when only a virtual vehicle vmC simulating a non-existent rear reference vehicle mC has been set by the virtual vehicle setting section 122.

Moreover, when the virtual vehicle vmA based on the vehicle in front mA, and either the virtual vehicle vmD based on the vehicle behind mD or the virtual vehicle vmC based on a non-existent rear reference vehicle mC have been set by the virtual vehicle setting section 122, the target area setting section 121 sets the target area TA between the respective virtual vehicles.

The lane change possibility determination section 123 performs some or all of the following determination tasks in order to determine whether or not it is possible for the vehicle M to change lanes into the target area TA set by the target area setting section 121. In the following explanation, the lane change possibility determination section 123 performs all of the following determination tasks in order to determine whether or not it is possible for the vehicle M to change lanes into the target area TA.

Primary Determination

Figure 10:
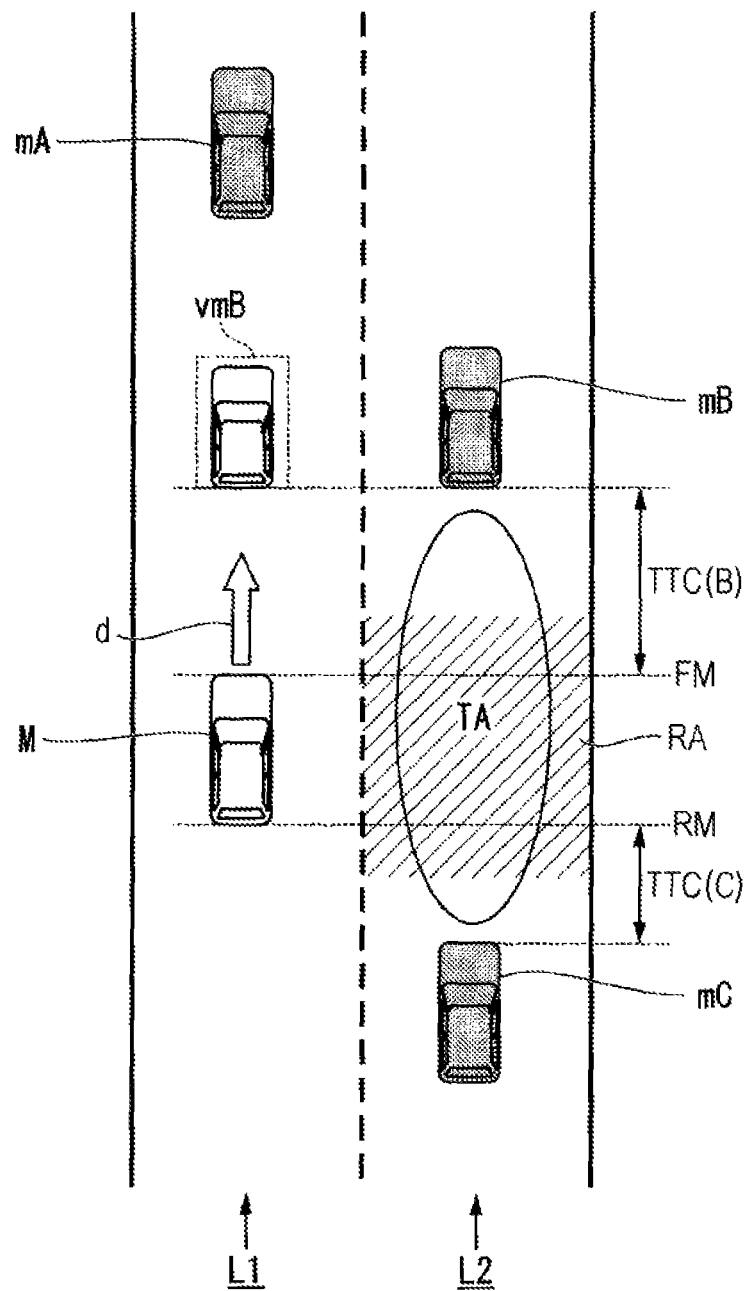
FIG. 10 is a diagram to explain a method for setting a restricted area.

As primary determination, for example, the lane change possibility determination section 123 sets a restricted area RA by projecting the vehicle M into the lane change target lane L2, adding a slight leeway to the front and rear. Explanation follows regarding the setting method of the restricted area RA, with reference to FIG. 10. FIG. 10 is a diagram for explaining the setting method of the restricted area RA. As illustrated in FIG. 10, the restricted area RA is set as a region extending from one edge to the other edge in the lateral direction of the lane L2. If even part of a nearby vehicle is present within the restricted area RA, the lane change possibility determination section 123 determines that it is not possible to change lanes into the target area TA.

When there is no nearby vehicle in the restricted area RA, the lane change possibility determination section 123 further determines whether or not lane changing is possible based on a Time-To-Collision (TTC) between the vehicle M and a nearby vehicle. For example, the lane change possibility determination section 123 considers an extension line FM and an extension line RM extending out virtually toward the side of the lane change target lane L2 at the front end and the rear end of the vehicle M. The lane change possibility determination section 123 computes a time-to-collision TTC (B) between the extension line FM and the front reference vehicle mB, and a time-to-collision TTC(C) between the extension line RM and the rear reference: vehicle mC. The time-to-collision TTC(B) is a time deprived by dividing the distance between the extension line FM and the front reference vehicle mB by a relative speed between the vehicle M and the front reference vehicle mB. The time-to-collision TTC(C) is a time derived by dividing the distance between the extension line RM and the rear reference vehicle mC by a relative speed between the vehicle M and the rear reference vehicle mC. The lane change possibility determination section 123 determines that it is possible for the vehicle M to change lanes into the target area TA when the time-to-collision TTC(B) is greater than a threshold value Th(B), and the time-to-collision TTC(C) is also greater than a threshold value Th(C).

Note that the time-to-collision TTC(B) may also be a time derived by dividing the distance between the extension line FM and a virtual vehicle treated as the front reference vehicle mB by the relative speed between the vehicle M and the virtual vehicle being treated as the front reference vehicle mB. Moreover, the time-to collision TTC(C) may also be a time derived by dividing the distance between the extension line RM and a virtual vehicle treated as the rear reference vehicle mC by the relative speed between the vehicle M and the virtual vehicle being treated as the rear reference vehicle mC.

Secondary Determination

As secondary determination, the lane change possibility determination section 123 also determines whether or not it is possible for the vehicle M to change lanes into the target area TA by factoring in the speed, acceleration, jerkiness, and the like of the vehicle in front mA, the front reference vehicle mB, and the rear reference vehicle mC. For example, if the speed of the front reference vehicle mB and the rear reference vehicle mC is greater than the speed of the vehicle in front mA, and it is anticipated that the front reference vehicle mB and the rear reference vehicle mC may overtake the vehicle in front mA within a timeframe required for the vehicle M to change lanes, the lane change possibility determination section 123 may determine that it is not possible for the vehicle M to change lanes into the target area TA set between the front reference vehicle mB and the rear reference vehicle mC.

Tertiary Determination

The lane change possibility determination section 123 may also perform tertiary determination, for example with respect to a course for lane changing generated by the second course generation section 124, described later. The tertiary determination is determination as to whether or not acceleration and deceleration, an orientation shift angle, yaw rate, and the like fall within specific ranges at each course point configuring the course for lane changing.

For example, the lane change possibility determination section 123 determines that it is not possible tor the vehicle M to change lanes into the target area TA if the acceleration and deceleration, orientation shift angle, yaw rate, and the like do not fall into the specific ranges. Moreover, the lane change possibility determination section 123 determines that it is possible for the vehicle M to change lanes into the target area TA if the acceleration and deceleration, orientation shift angle, yaw rate, and the like do fall into the specific ranges.

The second course generation section 124 generates a course for the vehicle M to change lanes into the target area TA, according to the results of the primary determination and the secondary determination by the lane change possibility determination section 123. Similarly to the course generated by the first course generation section 112 described above, this course is a collection of course points (a path) obtained by sampling future target positions that are anticipated to be reached at specific time intervals. The second course generation section 124 is an example of a "speed generation section".

For example, when the lane change possibility determination section 123 has determined that it is possible for the vehicle M to change lanes, the second course generation section 124 generates a course based on the positions and speeds of the three vehicles of the vehicle in front mA, and the front reference vehicle mB and the rear reference vehicle mC respectively ahead of and behind the target area TA, in order for the vehicle M to change lanes into the target area TA. Moreover, when the lane change possibility determination section 123 has determined it is not possible for the vehicle M to change lanes, the second course generation section 124 generates a course to keep the vehicle M in the current lane, and does not generate a course for the vehicle M to change lanes into the target area TA. The course for keeping in lane is, for example, a course for constant speed travel at the current speed of the vehicle M, a course to decelerate from the current speed, a course corresponding to the curvature of the road, or the like, similarly to the courses generated by the first course generation section 112.

Figure 11:
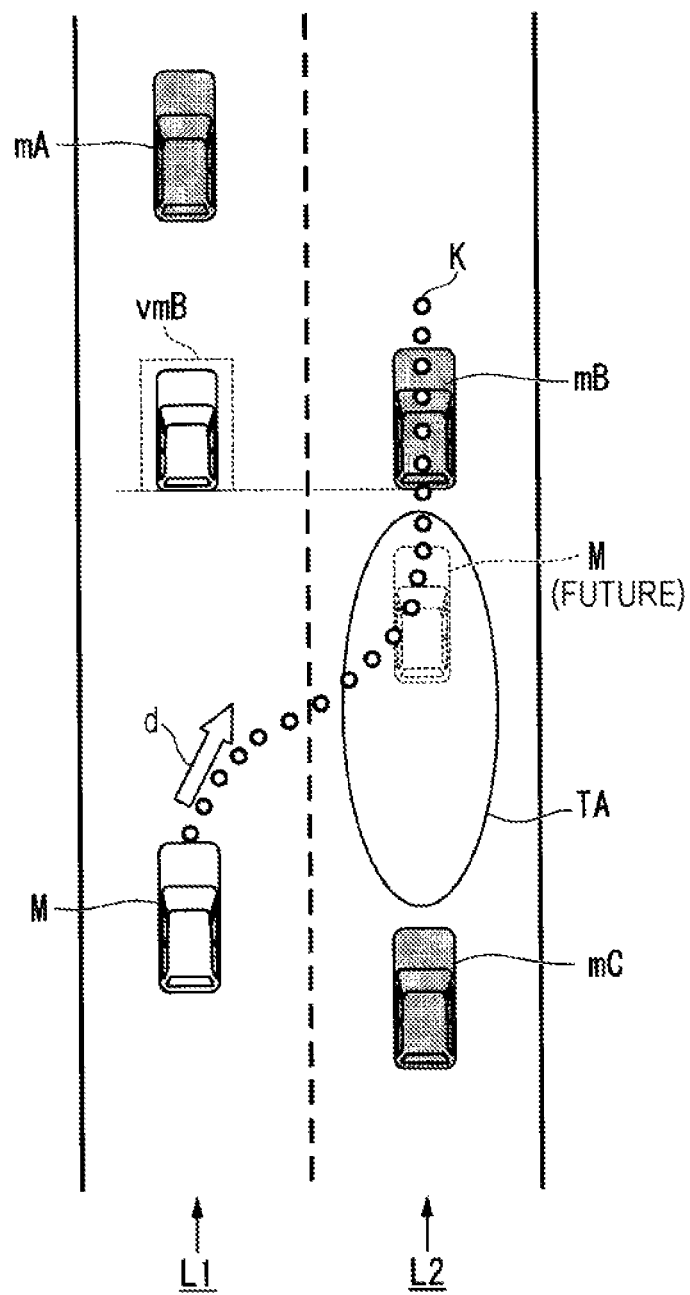
FIG. 11 is a diagram to explain a method of generating a course by a second course generation section.

FIG. 11 is a diagram to explain a course generation method of the second course generation section 124. For example, the second course generation section 124 hypothesizes that the front reference vehicle mB and the rear reference vehicle mC are traveling according to a specific speed model (for example, a speed model in which the speeds recognized by the environment recognition section 104 are constant), and based on the speed models of the three vehicles including the speed of the vehicle M, generates a coarse such that at a future point in time, the vehicle M will be present between the front reference vehicle mB and the rear reference vehicle mC, without the vehicle M getting too close to the vehicle in front mA. For example, the second course generation section 124 smoothly connects a polynomial curve such as a spline curve from the current position of the vehicle M to the position of the front reference vehicle mB at the future time, and arranges a specific number of the target positions K along the curve, at uniform intervals or non-uniform intervals. When this is performed, the second course generation section 124 generates the course such that at least one of the target positions K is disposed within the target area TA.

Figure 12:
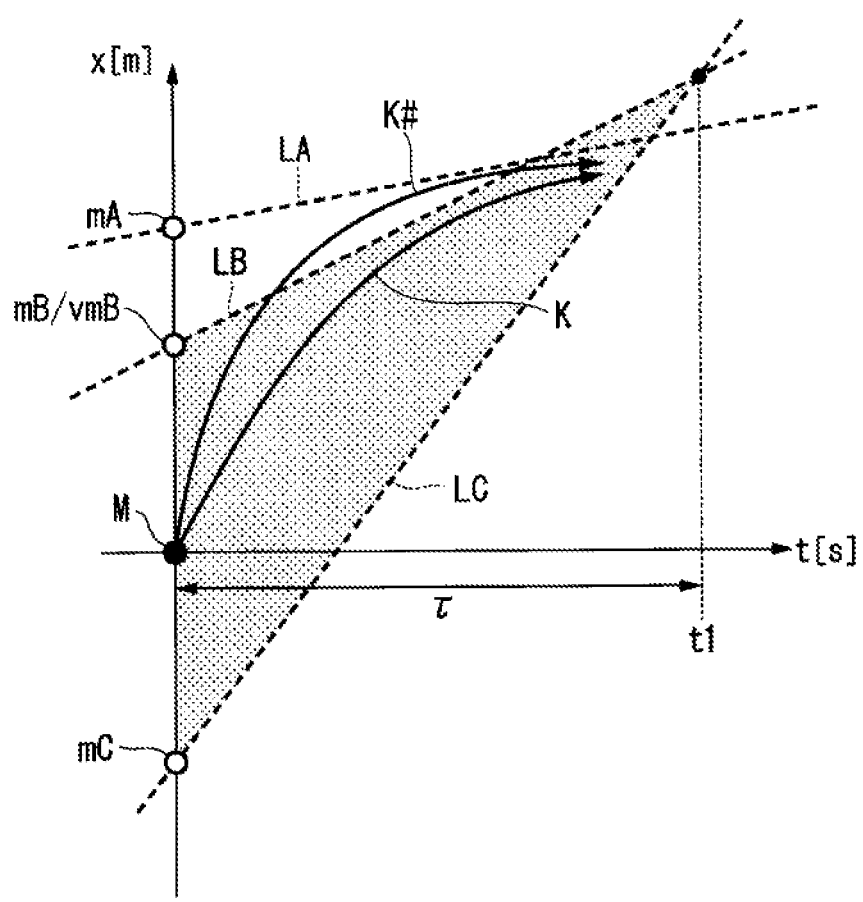
FIG. 12 is a diagram illustrating an example of a speed model in which a vehicle in front, a front reference vehicle, a virtual vehicle, and a rear reference vehicle have constant speeds.

FIG. 12 is a diagram illustrating an example of a speed model in which the speeds of the vehicle in front mA, the front reference vehicle mB, the virtual vehicle vmB, and the rear reference vehicle mC are constant. The speed model illustrated in FIG. 12 is anticipated in a situation in which the nearby vehicles are traveling as illustrated in FIG. 6. In FIG. 12, the vertical axis x represents the direction of progress of the respective vehicles along the lanes, and the horizontal axis t represents time. The dashed line LA represents displacement (change over time of the position) of the vehicle in front mA. The dashed line LB represents displacement of the front reference vehicle mB and the virtual vehicle vmB. The dashed line LC represents displacement of the rear reference vehicle mC.

For example, taking the example illustrated in FIG. 6, in a case in which the virtual vehicle vmB was not set, the second course generation section 124 would consider the three vehicles of the vehicle in front mA, the front reference vehicle mB, and the rear reference vehicle mC. In such a case, the second course generation section 124 would, for example, determine a target speed of the vehicle M so as not to catch up with the vehicle in front mA until the lane change into the adjacent lane has been completed, within a duration τ from the current time until a time t1 at which the rear reference vehicle mC catches up with the front reference vehicle mB (a duration until the target area TA disappears). The second course generation section 124 would also determine a target speed of the vehicle M in a range such that the vehicle M does not catch up with the front reference vehicle mB after completing the lane change into the target area TA. A course that realizes such target speeds is, for example, illustrated by the curve labeled K# in FIG. 12.

However, in the present embodiment, when the virtual vehicle vmB has been set as in the example in FIG. 6, the second course generation section 124 generates a course (the curve labeled K in FIG. 12) taking into consideration the three vehicles of the virtual vehicle vmB, the front reference vehicle mB, and the and the rear reference vehicle mC. When this is performed, the virtual vehicle vmB is set with the same speed as the front reference vehicle mB, and is set at the same position as the position of the front reference vehicle mB in the direction of vehicle progress (x direction). Considering the distances between the respective vehicles in the course K and the course K#, the inter-vehicle distance between the respective vehicles is greater in the course K than in the course K#, and the course K is a course enabling travel with a degree of leeway. Accordingly, with the vehicle control system 100, a vehicle occupant can be made to feel safe when in the self-driving mode. Since there is no need to consider the state of a vehicle that is not the benchmark vehicle (the vehicle in front mA in FIG. 12) when generating the course K, the vehicle control system 100 also enables the amount of calculation in order to generate the course to be reduced, enabling processing load to be reduced.

The course K (and the course K#) are generated as a collection of the course points, as explained using FIG. 5A to FIG. 5D and FIG. 11. Moreover, the speed indicated by the intervals between the course points is determined based on speed constraints, illustrated in FIG. 12 and FIG. 13, described later. For example, the second course generation section 124 determines the target speed at each future specific time interval of the vehicle M in a range that does not catch up with the virtual vehicle vmB within the duration τ, and determines a target speed of the vehicle M in a range that does not catch up with the front reference vehicle mB after the vehicle M has reached the target area TA. For example, the second course generation section 124 determines the arrangement intervals of the course points following a trend in which the course points are widely spaced at locations where the slope of the curve K is steep (namely, locations where acceleration is required), and tightly spaced at locations where the slope of the curve K is gentle (namely, locations where deceleration is required).

Figure 13:
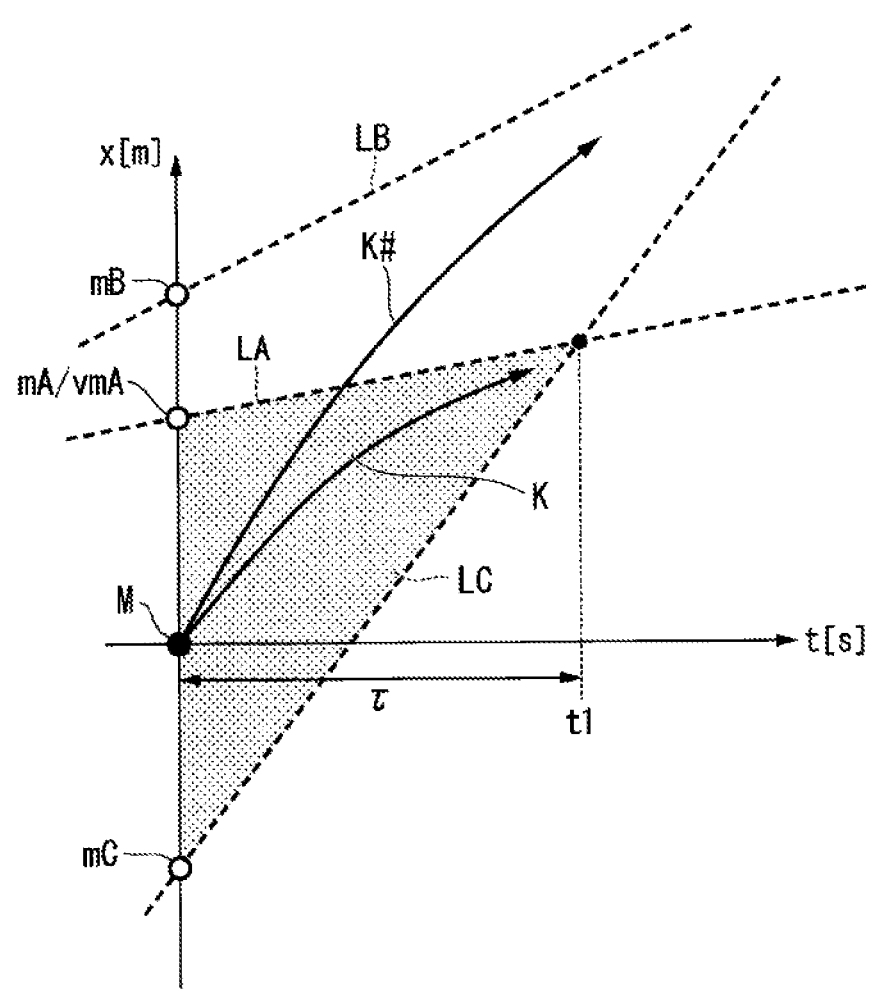
FIG. 13 is a diagram illustrating an example of a speed model in which a vehicle in front, a virtual vehicle, a front reference vehicle, and a rear reference vehicle have constant speeds.

FIG. 13 is a diagram illustrating an example of a speed model in which the speeds of the vehicle in front mA, the virtual vehicle vmA, the front reference vehicle mB, and the rear reference vehicle mC are constant. The speed model illustrated in FIG. 13 is anticipated in a situation in which the nearby vehicles are traveling as illustrated in FIG. 7.

For example, taking the example of FIG. 7, in a case in which the virtual vehicle vmA was not set, the second course generation section 124 would consider the three vehicles of the vehicle in front mA, the front reference vehicle mB, and the rear reference vehicle mC. In such a case, the second course generation section 124 would determine a target speed of the vehicle M in a range so as not to catch up with the vehicle in front mA before lane changing has been completed, and such that the vehicle M would arrive at the target area TA within the duration τ. The second course generation section 124 would also determination the target speed of the vehicle M in a range so as not to catch up with the front reference vehicle mB after lane change to the target area TA has been completed. An example of a course that achieves such target speeds is, for example, illustrated by the curve labeled K# in FIG. 13.

However, in the present embodiment, when the virtual vehicle vmA has been set as in the example in FIG. 7, the second course generation section 124 generates a course (the curve labeled K in FIG. 12) in consideration of the three vehicles of the virtual vehicle vmA, the vehicle in front mA, and the rear reference vehicle mC. When this is performed, the virtual vehicle vmA is set with the same speed as the vehicle in front mA, and is set at the same position as the position of the vehicle in front mA in the direction of vehicle progress (x direction). As described above, considering the distances between the respective vehicles in the course K and the course K#, the course K is a course enabling travel with greater leeway between the respective vehicles than the course K#. Accordingly, the vehicle control system 100 is capable of making a vehicle occupant feel safe when in the self-driving mode. Moreover, when the course K is generated, there is no need to consider the state of vehicles that are not the benchmark vehicle (the front reference vehicle mB in FIG. 13). Accordingly, the vehicle control system 100 enables the amount of calculation in order to generate the course to be reduced, thereby enabling processing load to be reduced.

Figure 14:
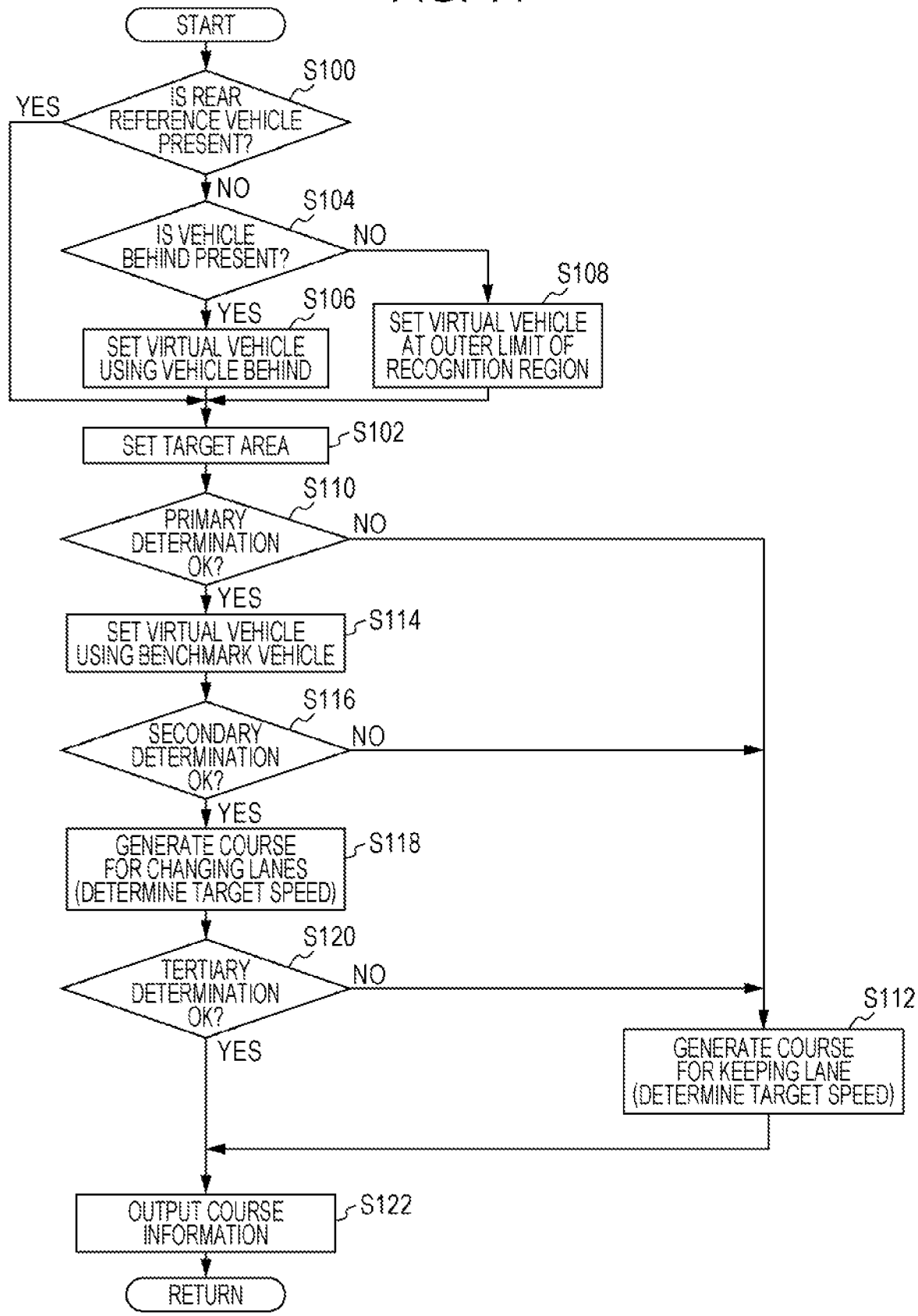
FIG. 14 is a flowchart illustrating an example of a flow of processing of a lane change control section in the first embodiment.

FIG. 14 is a flowchart illustrating an example of a flow of processing of the lane change control section 120 in the first embodiment. The processing in this flowchart is performed in a state in which an action plan has been generated by the action plan generation section 106, and is executed repeatedly at a specific cycle. Explanation is given regarding this flowchart for a case in which a vehicle in front mA and a front reference vehicle mB have been recognized.

First, the virtual vehicle setting section 122 determines whether or not a rear reference vehicle mC is present (step S100). When a rear reference vehicle mC is present, the target area setting section 121 sets the target area TA between the front reference vehicle mB and the rear reference vehicle mC (step S102).

However, when a rear reference vehicle mC is not present, the virtual vehicle setting section 122 determines whether or not a vehicle behind mD is present (step S104). When a vehicle behind mD is present, the virtual vehicle setting section 122 sets a virtual vehicle vmD, this being a virtual simulation of the vehicle behind mD in the adjacent lane, by the side of the vehicle behind mD (step S106). When this is performed, as the processing of step S102 described above, the target area setting section 121 sets the target area TA between the front reference vehicle mB and the virtual vehicle vmD.

However, when a vehicle behind mD is not present, the virtual vehicle setting section 122 sets a virtual vehicle vmC (specific virtual vehicle), this being a virtual simulation of a non-existent rear reference vehicle mC, at the outer limit of the recognition region of the environment recognition section 104 (step S108). When this is performed, as the processing of step S102 described above, the target area setting section 121 sets the target area TA between the front reference vehicle mB and the virtual vehicle vmC.

Next, as the primary determination, the lane change possibility determination section 123 sets the restricted area RA, and determines whether or not even part of a nearby vehicle is present inside the restricted area RA (step S110). When part of a nearby vehicle is present inside the restricted area RA (when the primary determination is not OK), the second course generation section 124, for example, sets the target speed of the vehicle M to the same speed as the speed of the vehicle in front mA, and generates a course to keep the vehicle M in the current lane (step S112). Note that when this is performed, if various virtual vehicles have been set, the virtual vehicle setting section 122 may delete any such virtual vehicles.

However, when there is no part of any nearby vehicle present inside the restricted area RA (when the primary determination is OK), the virtual vehicle setting section 122 compares the respective positions of the vehicle in front mA and the front reference vehicle mB, selects the vehicle that is closest to the vehicle M in the direction of vehicle progress as the benchmark vehicle, and sets a virtual vehicle, this being a virtual simulation of the benchmark vehicle, in the lane on the side at which the benchmark vehicle is not present (step S114). Note that in cases in which a virtual vehicle vmA, this being a virtual simulation of the vehicle in front mA has been set in the adjacent lane by the side of the vehicle in front mA, the target area setting section 121 may reset the target area TA to between the virtual vehicle vmA and the rear reference vehicle mC (or a virtual vehicle treated as the rear reference vehicle mC).

Next, as the secondary determination, the lane change possibility determination section 123 determines whether or not it is possible for the vehicle M to change lanes into the target area TA set by the target area setting section 121 (step S116). When it is not possible for the vehicle M to change lanes into the target area TA (when the secondary determination is not OK), the second course generation section 124 performs the processing of step S112 described above.

However, when it is possible for the vehicle M to change lanes into the target area TA (when the secondary determination is OK), the second course generation section 124 generates a course for the vehicle M to change lanes (step S118). Next, as the tertiary determination, the lane change possibility determination section 123 for example determines whether or not the acceleration and deceleration, an orientation shift angle, yaw rate, and the like are within specific ranges at each course point configuring the course for lane changing generated by the second course generation section 124 (step S120).

When the acceleration and deceleration, orientation shift angle, yaw rate, and the like are not within the specific ranges (when the tertiary determination is not OK), the second course generation section 124 performs the processing of step S112 described above. The second course generation section 124 then outputs information indicating the course for keeping in lane to the travel control section 130 (step S122).

However, when the acceleration and deceleration, orientation shift angle, yaw rate, and the like are within the specific ranges (when the tertiary determination is OK), as the processing of step S122 described above, the second course generation section 124 outputs information indicating the generated course for lane changing to the travel control section 130. This ends the processing of the flowchart.

Travel Control

The travel control section 130 sets the control mode to the self-driving mode or the manual driving mode under the control of the control switching section 140, and controls control targets including some or all of the traveling drive force output device 90, the steering device 92, and the brake device 94, according to the set control mode. When in the self-driving mode, the travel control section 130 reads the action plan information 156 generated by the action plan generation section 106, and controls the control targets based on the events included in the read action plan information 156.

For example, the travel control section 130 determines an electric motor control amount (for example a revolution speed) of the steering device 92 and an ECU control amount (for example a throttle opening amount of the engine, a shift level, or the like) of the traveling drive force output device 90, according to the target speed of the course generated toy the first course generation section 112 or the second course generation section 124. The travel control section 130 also determines an electric motor control amount of the steering device 92 corresponding to an angle formed between the direction of progress of the vehicle M and the direction toward the next target position based on the current target position, for each target position K.

The travel control section 130 outputs information indicating the control amounts to the corresponding control targets. Accordingly, the respective control target devices (90, 92, 94) can control themselves according to the information indicating the control amounts input from the travel control section 130. The travel control section 130 also adjusts the determined control amounts as appropriate based on the detection results of the vehicle sensors 60.

In the manual driving mode, when the lane change possibility determination section 123 has determined that "it is possible for the vehicle to change lanes", the travel control section 130 may output information indicating that it is possible to change lanes using speakers, a display device such as a liquid crystal display device, or the like installed in the vehicle M, or using the navigation device 50, in order to inform a driver and other occupants that it is possible to change lanes.

The control switching section 140 switches the control mode of the vehicle M by the travel control section 130 from the self-driving mode to the manual driving mode, or from the manual driving mode to the self-driving mode, based on the action plan information 156 generated by the action plan generation section 106 and stored in the storage section 150.

The control switching section 140 also switches the control mode of the vehicle M by the travel control section 130 from the self-driving mode to the manual driving mode, or from the manual driving mode to the self-driving mode, based on the control mode designation signals input from the switch 80. Namely, the control mode of the travel control section 130 may be changed as desired by operation by the driver or the like, during travel or when the vehicle is stationary.

The control switching section 140 also switches the control mode of the vehicle M by the travel control section 130 from the self-driving mode to the manual driving mode based on operation detection signals input from the operation detection sensors 72. For example, the control switching section 140 switches the control mode of the travel control section 130 from the self-driving mode to the manual driving mode when an operation amount included in an operation detection signal exceeds a threshold value, namely, when an operation with an operation amount exceeding a threshold value has been received by one of the operation devices 70. For example, during autonomous travel of the vehicle M by the travel control section 130 that has been set to the self-driving mode, when the steering wheel, accelerator pedal, or brake pedal is operated by a driver by an operation amount exceeding the threshold value, the control switching section 140 switches the control mode of the travel control section 130 from the self-driving mode to the manual driving mode. This thereby enables the vehicle control system 100 to switch immediately to the manual driving mode, without requiring operation of the switch 80, in response to a sudden operation by the driver when, for example, an object such as a person dashes out into the road, or the vehicle in front comes to a sudden stop. As a result, the vehicle control system 100 is capable of responding to emergency operation by the driver, thereby enabling an increase in travel safety.

According to the vehicle control system 100 of the first embodiment described above, the vehicle M can be made to change lanes with leeway in the inter-vehicle distances to the nearby vehicles by generating a course in which the target speed of the vehicle M is determined based on the state of the vehicle closest to the vehicle M in the direction of vehicle progress out of the vehicle in front mA and front reference vehicle mB. This thereby enables the vehicle control system 100 to achieve self-driving that feels safer.

According to the vehicle control system 100 of the first embodiment described above, out of the vehicle in front mA and the front reference vehicle mB, the vehicle closest to the vehicle M in the direction of vehicle progress is treated as a benchmark vehicle, and a virtual vehicle, this being a virtual simulation of the benchmark vehicle, is set. This thereby enables the processing load during course generation to be reduced in comparison to when a course is generated taking into consideration both the vehicle in front mA and the front reference vehicle mB.

Moreover, according to the vehicle control system 100 of the first embodiment described above, due to setting a virtual vehicle, a course is generated envisaging a situation in which vehicles are traveling at the same speed ahead of the vehicle M in both the current lane and the lane change target adjacent lane. Accordingly, engine hunting of the vehicle M arising due to the effect of a difference in speed between the vehicle in front mA and the front reference vehicle mB can be suppressed. The vehicle control system 100 of the first embodiment can accordingly improve driver ride comfort as a result.

Modified Example of the First Embodiment

Explanation follows regarding a modified example of the first embodiment. In the modified example of the first embodiment, in cases in which, as the tertiary determination by the lane change possibility determination section 123, it has been determined that the acceleration and deceleration, orientation shift angle, yaw rate, and the like are not within the specific ranges at any of the course points, the second course generation section 124 generates a course for lane changing based on a vehicle in front mA and a front reference vehicle mB that are actually present, and a rear reference vehicle mC (or a virtual vehicle treated as the rear reference vehicle mC), without considering a virtual vehicle based on the benchmark vehicle. Moreover, the lane change possibility determination section 123 determines whether or not it is possible for the vehicle M to change lanes into the target area TA by repeating the tertiary determination for each course point of a course re-generated by the second course generation section 124. In the following explanation, the repeated tertiary determination is referred to as quaternary determination.

Figure 15:
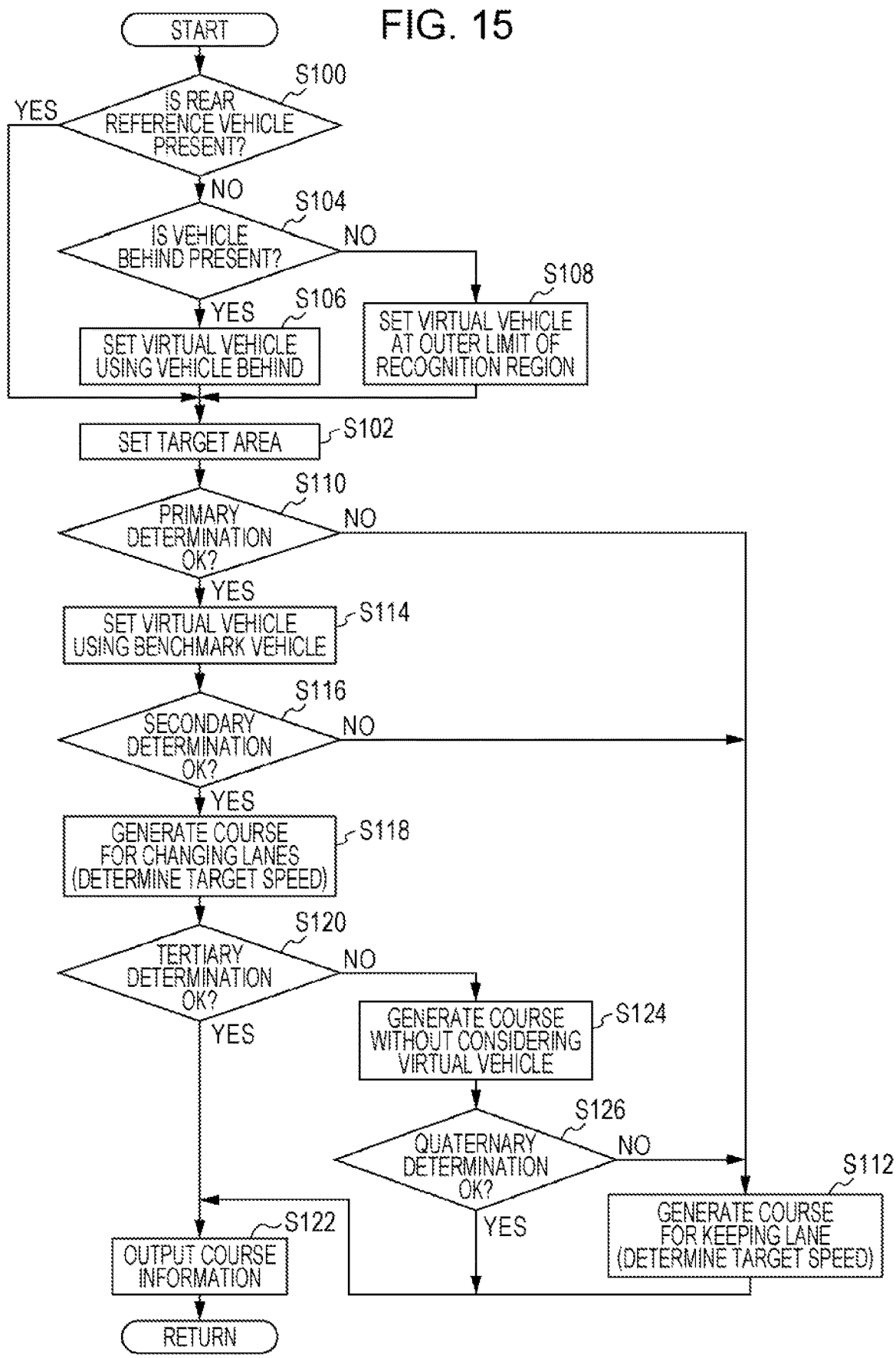
FIG. 15 is a flowchart illustrating an example of a flow of processing of a lane change control section in a modified example of the first embodiment.

FIG. 15 is a flowchart illustrating an example of a flow of processing of the lane change control section 120 in the modified example of the first embodiment. The processing in this flowchart is performed in a state in which an action plan has been generated by the action plan generation section 106, and is executed repeatedly at a specific cycle. Explanation is given regarding this flowchart for a case in which the vehicle in front mA and the front reference vehicle mB have been recognized.

Step S100 to step S122 in FIG. 15 are similar to step S100 to step S122 in FIG. 14 described above, and so explanation thereof is omitted.

When the acceleration and deceleration, orientation shift angle, yaw rate, and the like are not within the specific ranges at the tertiary determination processing at step S120 (when the tertiary determination is not OK), the second course generation section 124 generates a course for lane changing of the vehicle M based on the three vehicles of the vehicle in front mA and the front reference vehicle mB that have already been recognized by the environment recognition section 104, and the rear reference vehicle mC (or a virtual vehicle treated as the rear reference vehicle mC), without considering a virtual vehicle that is a virtual simulation of the benchmark vehicle (step S124).

Next, the lane change possibility determination section 123 performs the quaternary determination for each course point of the course generated by the second course generation section 124, and determines whether or not it is possible for the vehicle M to change lanes into the target area TA (step S126). When it is not possible for the vehicle M to change lanes into the target area TA, the second course generation section 124 generates a course to keep in lane, and outputs information indicating this course to the travel control section 130. However, when it is possible for the vehicle M to change lanes into the target area TA, the second course generation section 124 generates a course for lane changing, and outputs information indicating this course to the travel control section 130. This ends the processing of the flowchart.

According to the vehicle control system 100 of the modified example of the first embodiment described above, similarly to in the first embodiment described above, self-driving that feels safer can be achieved. Moreover, the vehicle control system 100 of the modified example of the first embodiment is capable of reducing processing load during course generation, similarly to in the first embodiment described above, and is also capable of suppressing engine hunting of the vehicle M.

Second Embodiment

Explanation follows regarding a second embodiment. A vehicle control system 100A of the second embodiment differs from the first embodiment in the point that a course for lane changing is generated based on a state of a vehicle traveling in an adjacent lane into which the vehicle M is attempting to change, and a state of a vehicle traveling in an adjacent lane into which the vehicle M is not attempting to change, out of adjacent lanes adjacent to the current lane. The following explanation focuses on this point of difference. Note that in the following explanation, an adjacent lane on the right side of the current lane is the lane into which the vehicle M is attempting to change (right side adjacent lane), and an adjacent lane on the left side of the current lane is the lane into which the vehicle M is not attempting to change (left side adjacent lane). Moreover, in the second embodiment, a vehicle traveling ahead of the vehicle M in the left side adjacent lane is referred to as a "front-and-side vehicle". The front-and-side vehicle is an example of a "second vehicle".

Figure 16:
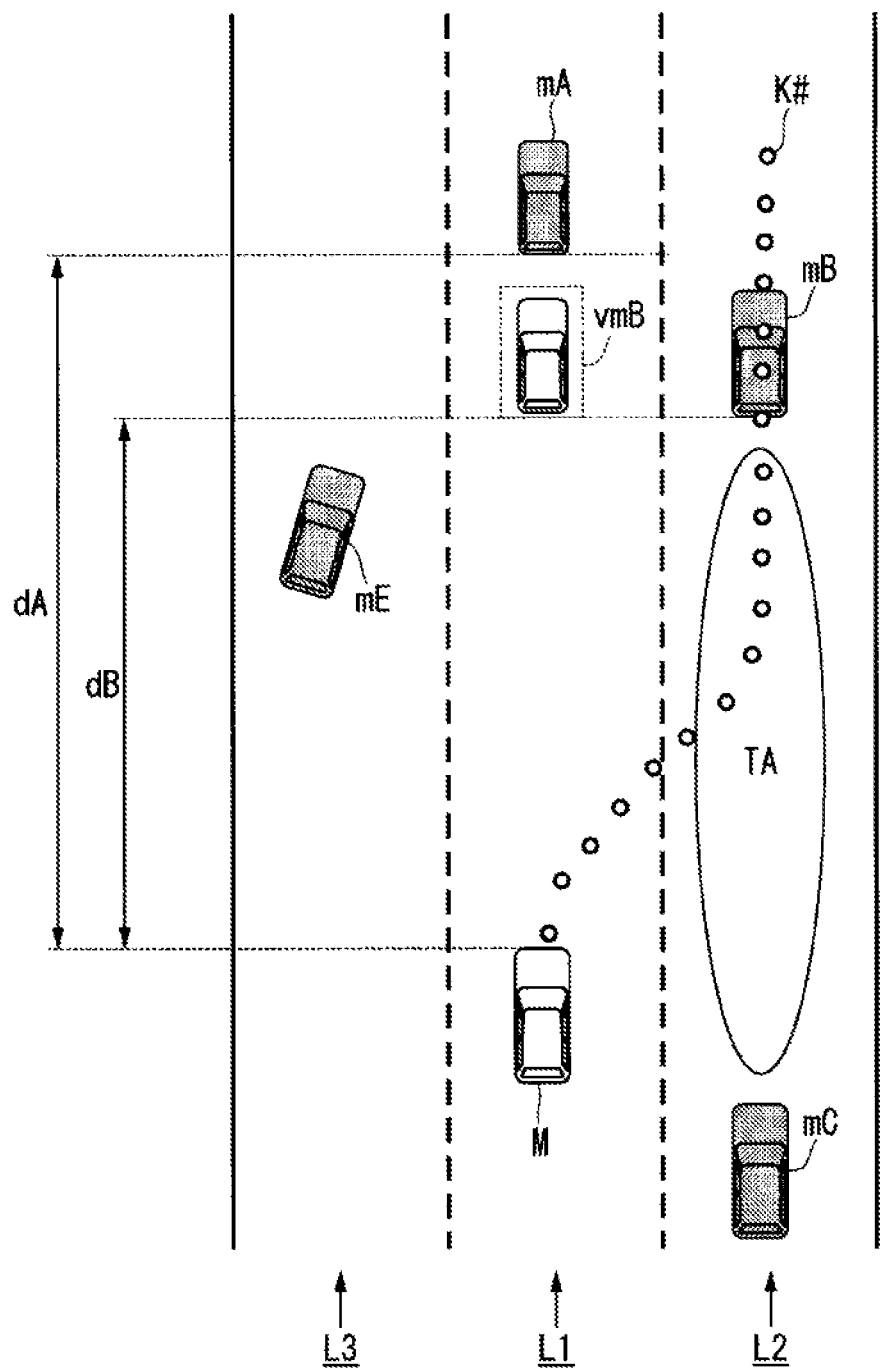
FIG. 16 is a diagram illustrating an example of a situation in which a course is generated without considering a vehicle traveling in an adjacent lane when a vehicle is not attempting to change lanes in a comparative example.
Figure 17:
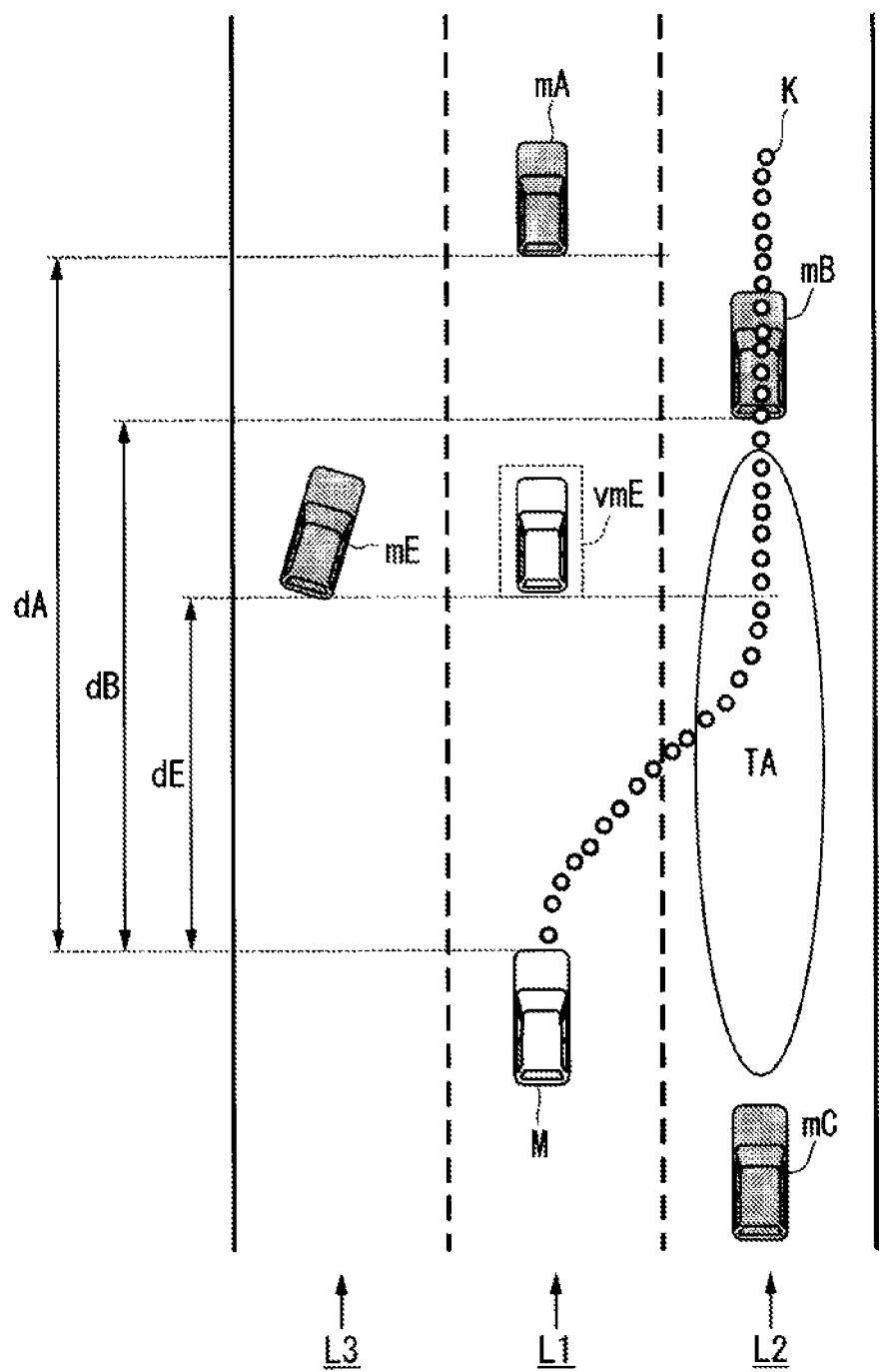
FIG. 17 is a diagram illustrating an example of a situation in which a course is generated considering a vehicle traveling in an adjacent lane when a vehicle is not attempting to change lanes in a second embodiment.

FIG. 16 is a diagram illustrating a comparative example, namely an example of a situation in which a course is generated without considering a vehicle traveling in the adjacent lane into which the vehicle M is not attempting to change. FIG. 17 is a diagram illustrating an example of a situation in the second embodiment, in which a course is generated taking into consideration a vehicle traveling in the adjacent lane into which the vehicle M is not attempting to change. In FIG. 16 and FIG. 17, L1, L2, and L3 respectively indicate the current lane, the right side adjacent lane, and the left side adjacent lane. Moreover, in FIG. 16 and FIG. 17, mB indicates a front reference vehicle traveling in the left side adjacent lane, and mE indicates a front-and-side vehicle traveling in the right side adjacent lane.

In the comparative example illustrated in FIG. 16, since the distance dB from the front end of the vehicle M to the rear end of the front reference vehicle mB is shorter than the distance dA from the front end of the vehicle M to the rear end of the vehicle in front mA, the virtual vehicle setting section 122 sets a virtual vehicle vmB, this being a virtual simulation of the front reference vehicle mB, in the current lane L1 by the side of the front reference vehicle mB. In such a case, based on the respective speeds of the three vehicles of the virtual vehicle vmB set by the virtual vehicle setting section 122, the front reference vehicle mB, and the rear reference vehicle mC, and the speed of the vehicle M, the second course generation section 124 generates a course such that the vehicle M will be present between the front reference vehicle mB and the rear reference vehicle mC at a particular future point in time, without getting too close to the virtual vehicle vmB. This course is a collection of course points, for example, indicated by K# in FIG. 16.

However, in the present embodiment, as illustrated in FIG. 17, the virtual vehicle setting section 122 considers a distance dE from the front end of the vehicle M to the rear end of the front-and-side vehicle mE in addition to the distance dA and distance dB described above, and selects as the benchmark vehicle the vehicle that is closest to the vehicle M out of the three vehicles. In the example of FIG. 17, since the distance dE is the shortest, the front-and-side vehicle mE is selected as the benchmark vehicle. In such a case, the virtual vehicle setting section 122 sets a virtual vehicle vmE, this being a virtual simulation of the front-and-side vehicle mE, in the current lane L1 by the side of the front-and-side vehicle mE. In this case, based on the respective speeds of the three vehicles of the virtual vehicle vmE, the front-and-side vehicle mE, and the rear reference vehicle mC, and the speed of the vehicle M, the second course generation section 124 generates a course such that the vehicle M will be present between the front reference vehicle mB and the rear reference vehicle mC at a particular future point in time, without getting too close to the virtual vehicle vmE.

For example, in the situation illustrated in FIG. 16, the front-and-side vehicle mE traveling in the left side adjacent lane L3 could enter the current lane L1 while the vehicle M is changing lanes. In such cases, the vehicle M that is traveling according to the speed of the vehicle in front mA has to adapt swiftly to the speed of the front-and-side vehicle mE. Accordingly, it is sometimes necessary for the vehicle M to decelerate sharply when accelerating in order to change lanes, for example.

However, in the present embodiment illustrated in FIG. 17, the virtual vehicle setting section 122 sets a virtual vehicle considering the distance dE from the front end of the vehicle M to the rear end of the front-and-side vehicle mE in addition to the distance dA and the distance dB described above. Accordingly, the second course generation section 124 is capable of determining a target speed for lane changing that considers the speed of vehicles having a high probability of entering the current lane L1 during lane changing. The vehicle control system 100A is thereby capable of improving safety during lane changing as a result. For example, the route generated in the situation illustrated in FIG. 17 is expressed by the collection of course points labeled K in FIG. 17. Since the arrangement intervals between the course points K consider the position and speed of the front-and-side vehicle mE, the arrangement intervals are more tightly spaced than those of the course points K# in FIG. 16. As a result, the travel distance of the vehicle M per unit time is shorter, thereby reducing the target speed. As a result, the vehicle control system 100A of the second embodiment is capable of allowing leeway in the inter-vehicle distance with the nearby vehicles during lane changing, thereby enabling an occupant of the vehicle to feel safe.

Figure 18:
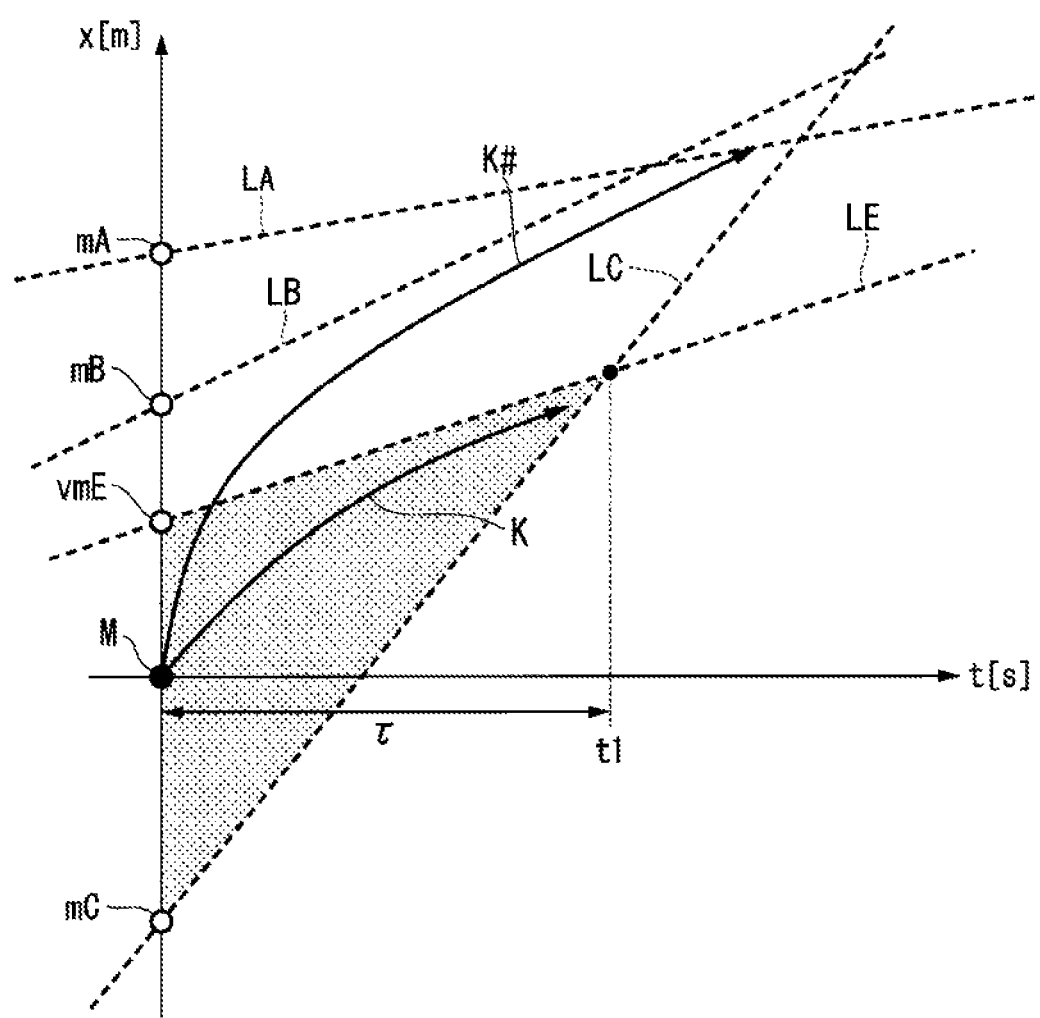
FIG. 18 is a diagram illustrating an example of a speed model in which a vehicle in front, a front reference vehicle, a virtual vehicle, and a rear reference vehicle have constant speeds.

FIG. 18 is a diagram illustrating an example of a speed model in which the speeds of the vehicle in front mA, the front reference vehicle mB, the virtual vehicle vmE, and the rear reference vehicle mC are constant. The speed model illustrated in FIG. 18 is anticipated in a situation in which the nearby vehicles are traveling as illustrated in FIG. 17. The dashed lines LA, LB, LE, LC respectively represent the speed of the vehicle in front mA, the speed of the front reference vehicle mB, the speed of the virtual vehicle vmE, and the speed of the rear reference vehicle mC. Moreover, the example of FIG. 18 illustrates a case in which the speed of the front reference vehicle mB is greater than the speed of the virtual vehicle vmE.

As illustrated in FIG. 18, the course K generated when the virtual vehicle vmE has been set is a course allowing travel with greater leeway with respect to the respective vehicles than the course K# generated when the virtual vehicle vmE is not set.

According to the vehicle control system 100A of the second embodiment described above, similarly to in the first embodiment described above, self-driving that feels safer can be achieved. Moreover, the vehicle control system 100A of the second embodiment is capable of reducing processing load during course generation, similarly to the first exemplary embodiment described above, and is also capable of suppressing engine hunting of the vehicle M.

Third Embodiment

Explanation follows regarding a third embodiment. A vehicle control system 100B of the third embodiment differs from the first embodiment and the second embodiment in the point that a virtual vehicle is set when generating a course in which it is necessary for the vehicle M to straddle lanes, or in which there is a high possibility of the vehicle M straddling lanes, such as in a course avoiding an obstacle. The following explanation focuses on this point of difference. "Straddling lanes" refers to part of the vehicle body of the vehicle M overlapping a boundary line between the current lane and an adjacent lane as viewed looking down on the vehicle from above, when the vehicle M is traveling along a generated course avoiding an obstacle.

Figure 19:
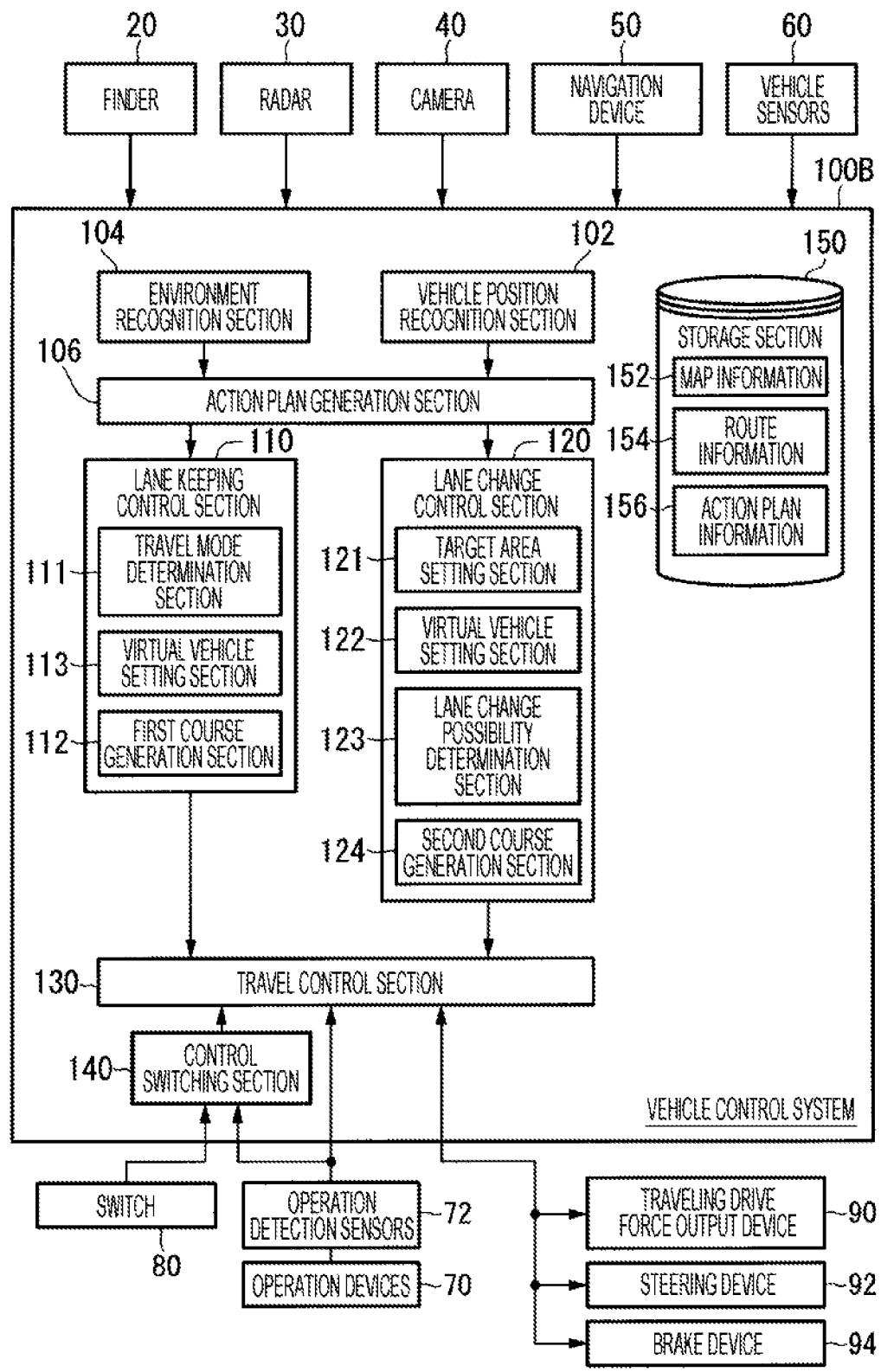
FIG. 19 is a functional configuration diagram of a vehicle, focusing on a vehicle control system according to a third embodiment.

FIG. 19 is a functional configuration diagram of the vehicle M, focusing on the vehicle control system 100B according to the third embodiment. The vehicle control system 100B according to the third embodiment further includes a lane keeping control section 110 in addition to the configurations described above in the first and second embodiments.

The lane keeping control section 110 includes the: travel mode determination section 111 and the first course generation section 112 described above, as well as a virtual vehicle setting section 113. Some or all of the travel mode determination section 111, the first course generation section 112, and the virtual vehicle setting section 113 may be implemented by a processor such as a CPU executing a program. Moreover, some or all of these sections may be implemented by hardware using an LSI, ASIC, or the like.

When the travel mode determination section 111 has determined the travel mode to be obstacle avoidance travel, the virtual vehicle setting section 113 of the lane keeping control section 110 compares the position of a vehicle (referred to below as the front-and-side vehicle mF) traveling ahead of the vehicle M in an adjacent lane, in which the vehicle M travels when performing avoidance, against the position of the vehicle in front mA described above, and selects the vehicle that is closest to the vehicle M in the direction of vehicle progress as a benchmark vehicle. The virtual vehicle setting section 113 then sets a virtual vehicle, this being a virtual simulation of the benchmark vehicle.

Figure 20:
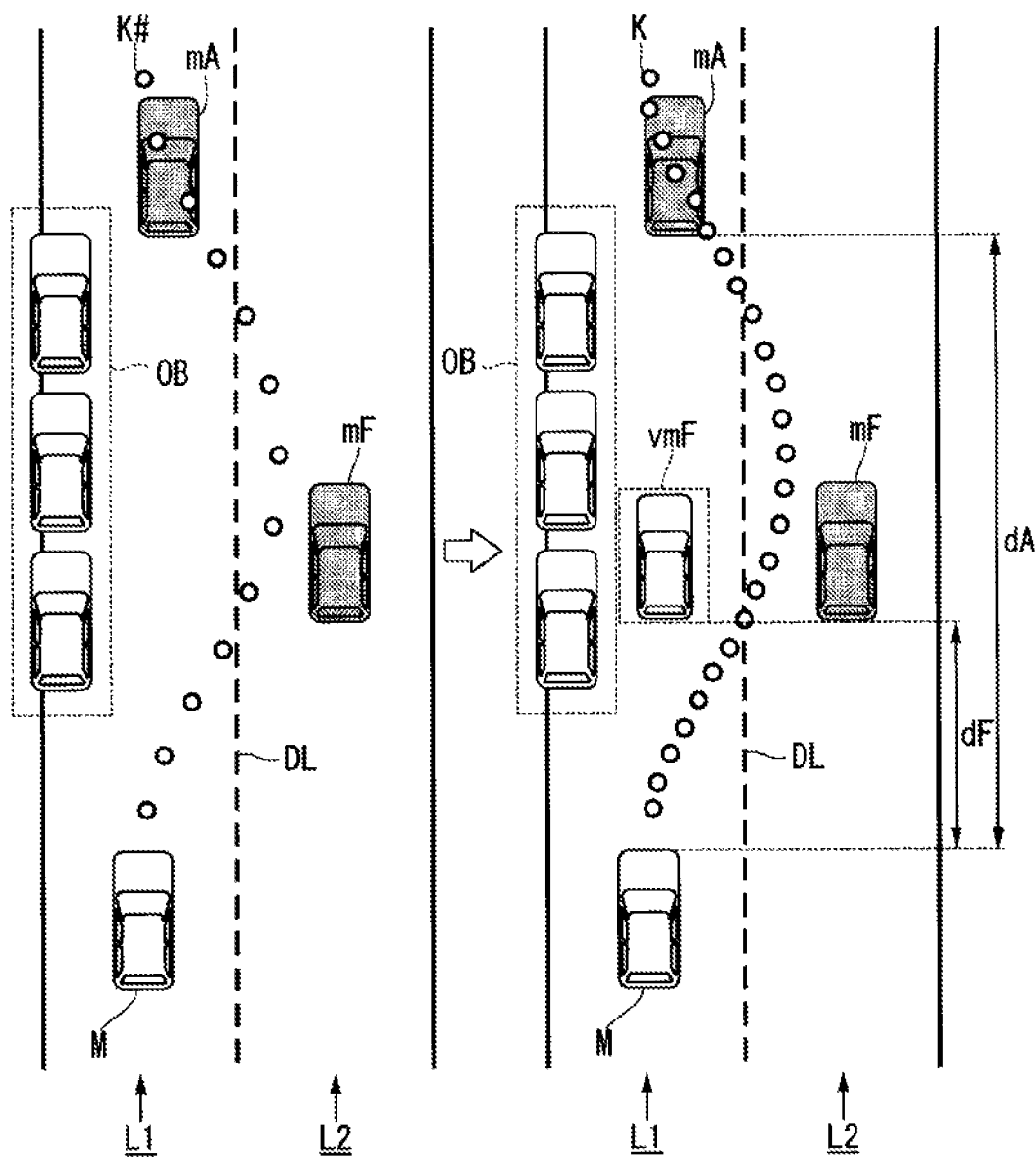
FIG. 20 is a diagram illustrating an example of a situation in which a virtual vehicle is set when avoiding an obstacle.

FIG. 20 is a diagram illustrating an example of a situation in which a virtual vehicle is set when avoiding an obstacle.

The obstacle OB in FIG. 20 is, for example, vehicles parked on one side of the current lane L1. In the situation illustrated in FIG. 20, the travel mode determination section 111 considers the parked vehicles to be the obstacle OB, and determines the travel mode to be the obstacle avoidance travel.

In the example illustrated in FIG. 20, a distance dF from the vehicle M to the front-and-side vehicle mF is shorter than the distance dA from the vehicle M to the vehicle in front mA. Accordingly, the virtual vehicle setting section 113 sets a virtual vehicle vmF, this being a virtual simulation of the front-and-side vehicle mF, in the current lane L1 by the side of the front-and-side vehicle mF. The first course generation section 112 generates a course, part of which crosses over from the current lane L1 to the adjacent lane L2, in order to avoid the obstacle OB. In such a case, in order to avoid the obstacle OB, the vehicle M straddles a boundary line DL between the current lane L1 and the adjacent lane L2. Namely, the vehicle M travels between the current lane L1 and the adjacent lane L2. When this occurs, the first course generation section 112 determines the target speed of the vehicle M as a speed in a range that will not catch up with the virtual vehicle vmF, and generates a course K that avoids the obstacle. The arrangement intervals of the course points configuring the course K are, for example, more tightly spaced than the arrangement intervals of the course points configuring a course K# generated when a virtual vehicle is not set, and so the speed of travel of the vehicle M is lower. Accordingly, the vehicle control system 100B is capable of suppressing the occurrence of a situation in which the vehicle M and the front-and-side vehicle mF travel side-by-side when the vehicle M is avoiding the obstacle OB.

According to the vehicle control system 100B of the third embodiment described above, similarly to in the first and second embodiments described above, self-driving that feels safer can be achieved. Moreover, similarly to in the first and the second embodiments described above, the vehicle control system 100B of the third embodiment is capable of reducing processing load during course generation, and is also capable of suppressing engine hunting of the vehicle M.

Fourth Embodiment

Explanation follows regarding a fourth embodiment. A vehicle control system 100C of the fourth embodiment differs from those of the first to the third embodiments in the point that an event is set based on a route to a destination, and rather than performing self-driving, the vehicle M simply travels so as to follow the vehicle in front mA at a constant inter-vehicle distance between the vehicle M and the vehicle in front mA. The following explanation focuses on this point of difference. The following travel may be implemented by Adaptive Cruise Control, for example.

Figure 21:
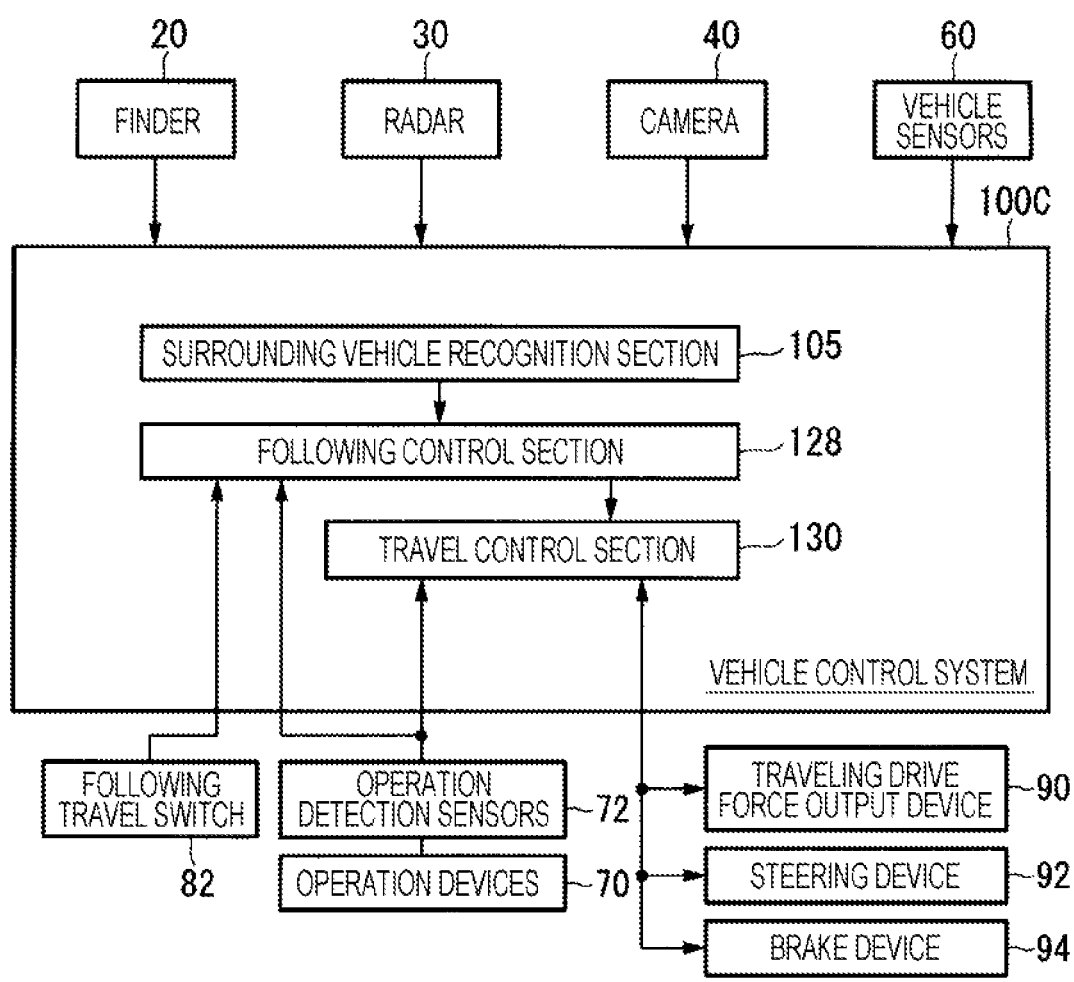
FIG. 21 is a functional configuration diagram of a vehicle focusing on a vehicle control system according to a fourth embodiment.

FIG. 21 is a functional configuration diagram of the vehicle M, focusing on the vehicle control system 100C according to the fourth embodiment. In the fourth embodiment, the vehicle M is provided with, for example, the finders 20, the radars 30, the camera 40, the vehicle sensors 60, the operation devices 70, the operation detection sensors 72, the traveling drive force output device 90, the steering device 92, and the brake device 94 described above, as well as a following travel switch 82 and the vehicle control system 100C. Of these configurations and functional sections, in the following explanation, explanation regarding sections similar to configurations or functional sections in the first to the third embodiments described above will be omitted.

The following travel switch 82 is a switch that is operated by a driver or the like. The following travel switch 82 receives operation by a driver or the like, and generates a control mode designation signal designating a control mode by the travel control section 130 to be either a following travel mode or the manual driving mode, and outputs the control mode designation signal to a following control section 128. The following travel mode is a mode for traveling following a vehicle in front so as to maintain a constant infer-vehicle distance from the vehicle in front when a vehicle in front is present, and so as to travel at a preset speed when there is no vehicle in front present.

The vehicle control system 100C includes, for example, a nearby vehicle recognition section 105, the following control section 128, and the travel control section 130. Some or all of these may be implemented by a processor such as a CPU executing a program. Moreover, some or all of these may be implemented by hardware using LSI, ASIC, or the like. The nearby vehicle recognition section 105 is another example of a "detection section", and the following control section 128 is another example of a "speed generation section" and "virtual vehicle setting section".

Out of nearby vehicles detected by the finders 20, the radars 30, the camera 40, and the like, the nearby vehicle recognition section 105 recognizes a state of a vehicle in front mA, and states of vehicles travelling ahead of the vehicle M in adjacent lanes. These states may include, for example, the position, speed, and orientation of the vehicles. In the following explanation of the fourth embodiment, an adjacent lane extending in the direction of progress adjacent to the right of the current lane is referred to as the right side adjacent lane, and an adjacent lane extending in the direction of progress adjacent to the left of the current lane is referred to as the left side adjacent lane. Moreover, a vehicle traveling ahead of the vehicle M in the right side adjacent lane is referred to as the "front-and-side vehicle mG", and a vehicle traveling ahead of the vehicle M in the left side adjacent lane is referred to as the "front-and-side vehicle mH". The front-and-side vehicle mG and the front-and-side vehicle mH are examples of a "second vehicle".

When driver operation or the like has been received by the following travel switch 82, the following control section 128 derives a target speed of the vehicle M for a future point in time. When a vehicle in front mA has not been recognized by the nearby vehicle recognition section 105, for example, the following control section 128 sets the target speed to a specific speed.

When a vehicle in front mA has been recognized by the nearby vehicle recognition section 105, and a front-and-side vehicle mG and front-and-side vehicle mH have not been recognized by the nearby vehicle recognition section 105, the following control section 128 determines a target speed that maintains the inter-vehicle distance between the vehicle in front mA and the vehicle M based on the state of the position, speed, and the like of the vehicle in front mA so as to follow the vehicle in front mA.

Moreover, when a vehicle in front mA has been recognized by the nearby vehicle recognition section 105, and one out of a front-and-side vehicle mG or a front-and-side vehicle mH has been recognized by the nearby vehicle recognition section 105, the following control section 128 compares the position of the vehicle in front mA against the position of the front-and-side vehicle mG or the front-and-side vehicle mH, and when the front-and-side vehicle is the closer to the vehicle M in the direction of vehicle progress, the following control section 128 sets a virtual vehicle, this being a virtual simulation of the front-and-side vehicle, in the current lane by the side of the front-and-side vehicle.

Moreover, when a vehicle in front mA has been recognized by the nearby vehicle recognition section 105, and both a front-and-side vehicle mG and a front-and-side vehicle mH have been recognized by the nearby vehicle recognition section 105, the following control section 128 compares the position of the vehicle in front mA, the position of the front-and-side vehicle mG, and the position of the front-and-side vehicle mH against each other, and in cases in which one of the front-and-side vehicles is closest to the vehicle M in the direction of vehicle progress, the following control section 128 sets a virtual vehicle, this being a virtual simulation of that front-and-side vehicle, in the current lane by the side of the front-and-side vehicle.

The following control section 128 then determines the target speed as a speed that maintains a constant inter-vehicle distance between the set virtual vehicle and the vehicle M, and that follows the virtual vehicle. The virtual vehicle is, for example, set with the same speed as the front-and-side vehicle.

The travel control section 130 determines operation amounts of the traveling drive force output device 90, the brake device 94, and the accelerator pedal, such that the vehicle M travels at the target speed derived by the following control section 128. Note that the following control section 128 switches the control mode of the vehicle M by the travel control section 130 from a following control mode to the manual driving mode based on operation detection signals input from the operation detection sensors 72.

Figure 22:
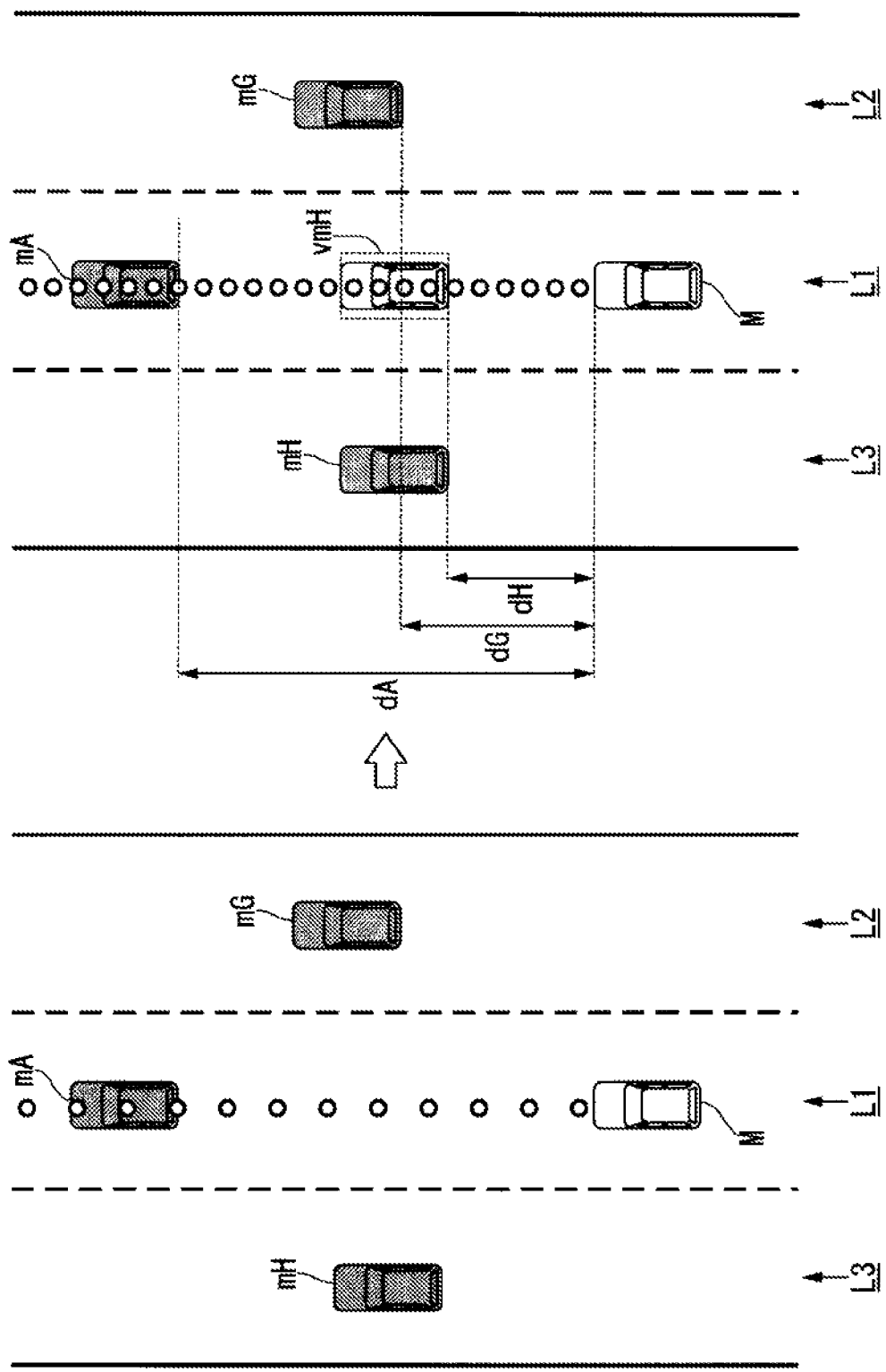
FIG. 22 is a diagram illustrating an example of a situation in which a virtual vehicle is set during following travel.

FIG. 22 is a diagram illustrating an example of a situation in which a virtual vehicle is set in the following travel mode. In the example of FIG. 22, a front-and-side vehicle mG traveling in the right side adjacent lane L2 and a front-and-side vehicle mH traveling in the left side adjacent lane L3 have been recognized. Accordingly, out of these vehicles, the following control section 128 selects the vehicle closer to the vehicle M in the direction of vehicle progress (the front-and-side vehicle mH in FIG. 22) as a benchmark vehicle, and sets a virtual vehicle, this being a virtual simulation of the benchmark vehicle, in the current lane by the side of the benchmark vehicle. When the target speed is expressed by the arrangement intervals of the course points, as described above in the first to the third embodiments, after setting the virtual vehicle, the inter-vehicle distance to the virtual vehicle vmH becomes shorter than before setting the virtual vehicle, and so the arrangement intervals of the course points become more tightly spaced, and this is accompanied by a decrease in the target speed.

Accordingly, by executing following travel control in accordance with rules, the vehicle control system 100C is capable of suppressing the occurrence of a penned-in state in which the vehicle M travels between the front-and-side vehicle mG and the front-and-side-vehicle mH. Similarly to in the first to the third embodiments described above, this thereby enables the vehicle control system 100C to achieve self-driving that feels safer.

Explanation has been given above regarding embodiments for implementing the present disclosure. However, the present disclosure is in no way limited to these embodiments, and various modifications or substitutions may be implemented within a range that does not depart from the spirit of the present disclosure.

What is claimed is:

1. A vehicle control system comprising:
    a detection section configured to detect a presence and state of nearby vehicles traveling in a vicinity of a subject vehicle, the detection section being capable of detecting the nearby vehicles including at least a first vehicle traveling ahead of the subject vehicle in a current lane in which the subject vehicle is traveling and a second vehicle traveling ahead of the subject vehicle in an adjacent lane adjacent to the current lane, a distance between the subject vehicle and the first vehicle traveling in the current lane being compared with a distance between the subject vehicle and the second vehicle traveling in the adjacent lane in a traveling direction of the subject vehicle such that the nearby vehicle closest to the subject vehicle in the traveling direction is selected as a benchmark vehicle among the detected nearby vehicles;
    a target speed generation section comprising at least one of a course generation section and a following control section and configured to generate a target speed of the subject vehicle based on the detected state of the benchmark vehicle; and
    a travel control section configured to automatically control at least acceleration and deceleration of the subject vehicle based on the target speed generated by the target speed generation section.

2. The vehicle control system according to claim 1, further comprising:
    a virtual vehicle setting section configured to set a first virtual vehicle traveling in the same state as the benchmark vehicle, but in a position next to the benchmark vehicle in the current or adjacent lane in which the benchmark vehicle is not present; wherein
    the target speed generation section generates the target speed of the subject vehicle based on the state of the benchmark vehicle and the state of the first virtual vehicle set by the virtual vehicle setting section.

3. The vehicle control system according to claim 1, wherein, in a case in which the subject vehicle changes lanes from the current lane to the adjacent lane, or in a case in which the subject vehicle is traveling straddling the current lane and the adjacent lane, the target speed generation section generates the target speed of the subject vehicle based on the state of the benchmark vehicle.

4. The vehicle control system according to claim 3, further comprising:
    a setting section configured to, in a case in which the subject vehicle changes lanes from the current lane to the adjacent lane, set a target area in the adjacent lane which the subject vehicle moves to, wherein
    the detection section is capable of detecting a presence and state of a third vehicle traveling immediately behind the target area,
    when the subject vehicle changes lanes from the current lane to the adjacent lane, out of the nearby vehicles, the target speed generation section treats a vehicle traveling immediately ahead of the target area as the second vehicle, and generates a target speed for the subject vehicle until the subject vehicle reaches the target area based on the state of the benchmark vehicle and the state of the third vehicle traveling immediately behind the target area.

5. The vehicle control system according to claim 4, further comprising:
    a lane change possibility determination section configured to determine whether or not it is possible for the subject vehicle to change lanes to the target area based on the target speed generated by the target speed generation section, wherein when the subject vehicle changes lanes from the current lane to the adjacent lane, in a case in which the lane changing is determined not to be possible by the lane change possibility determination section based on the target speed of the vehicle generated based on the state of the benchmark vehicle and the state of the third vehicle traveling immediately behind the target area, the speed generation section re-generates a target speed of the subject vehicle until the subject vehicle reaches the target area based on the state of the first vehicle, the state of the second vehicle, and the state of the third vehicle.

6. The vehicle control system according to claim 4, wherein:

the detection section is capable of detecting a presence and state of a fourth vehicle traveling immediately behind the subject vehicle, in a case in which the third vehicle traveling immediately behind the target area has not been detected by the detection section, the virtual vehicle setting section sets in the adjacent lane a second virtual vehicle traveling in the same state as the fourth vehicle traveling immediately behind the subject vehicle; and the target speed generation section generates a target speed of the subject vehicle until the subject vehicle reaches the target area based on the state of the benchmark vehicle and the state of the second virtual vehicle set by the virtual vehicle setting section.

7. The vehicle control system according to claim 3, wherein:

in a case in which the target speed generation section generates the target speed of the subject vehicle so as to travel following the first vehicle, the target speed generation section generates the target speed of the subject vehicle based on the state of the benchmark vehicle in a case in which the subject vehicle travels straddling the current lane and the adjacent lane in order to avoid an obstacle in the current lane.

8. The vehicle control system according to claim 1, wherein in a case in which the target speed generation section generates the target speed of the subject vehicle so as to travel following the first vehicle, the target speed generation section generates the target speed of the subject vehicle based on the state of the benchmark vehicle.

9. A vehicle control method performed by a vehicle computer, the vehicle control method comprising:

detecting a presence and state of nearby vehicles traveling in a vicinity of a subject vehicle, the nearby vehicles including at least a first vehicle traveling ahead of the subject vehicle in a current lane in which the subject vehicle is traveling and a second vehicle traveling ahead of the subject vehicle in an adjacent lane adjacent to the current lane;

selecting a benchmark vehicle from out of the detected nearby vehicles by comparing a distance between the subject vehicle and the first vehicle traveling in the current lane with a distance between the subject vehicle and the second vehicle traveling in the adjacent lane in a traveling direction of the subject vehicle, the benchmark vehicle being defined as a vehicle closest to the subject vehicle in the traveling direction of the subject vehicle among the detected nearby vehicles;

generating a target speed of the subject vehicle based on the detected state of the benchmark vehicle; and automatically controlling at least acceleration and deceleration of the subject vehicle based on the generated target speed.

10. A non-transitory computer readable storage medium storing therein a vehicle control program that causes a vehicle computer to perform the steps of:

detecting a presence and state of nearby vehicles traveling in the vicinity of a vehicle, the detection section being capable of detecting the nearby vehicles including at least a first vehicle traveling ahead of the subject vehicle in a current lane in which the subject vehicle is traveling and a second vehicle traveling ahead of the subject vehicle in an adjacent lane adjacent to the current lane;

selecting a benchmark vehicle from out of the detected nearby vehicles by comparing a distance between the subject vehicle and the first vehicle traveling in the current lane with a distance between the subject vehicle and the second vehicle traveling in the adjacent lane in a traveling direction of the subject vehicle, the benchmark vehicle being defined as a vehicle closest to the subject vehicle in the traveling direction of the subject vehicle among the detected nearby vehicles;

generating a target speed of the subject vehicle based on the detected state of the benchmark vehicle; and automatically control at least acceleration and deceleration of the subject vehicle based on the generated target speed.

11. The vehicle control system according to claim 1, which is further configured to determine whether or not a distance between the first vehicle and the second vehicle is within a predetermined range and select one of the first and second vehicles which is slower than the other as the benchmark vehicle.

* * * * *